United States Patent
Kim et al.

(10) Patent No.: US 8,867,499 B2
(45) Date of Patent: Oct. 21, 2014

(54) METHOD AND APPARATUS FOR TRANSMITTING A SIGNAL IN A WIRELESS COMMUNICATION SYSTEM

(75) Inventors: Hak Seong Kim, Anyang-si (KR); Han Byul Seo, Anyang-si (KR); Ki Jun Kim, Anyang-si (KR)

(73) Assignee: LG Electronics Inc., Seoul (KR)

(*) Notice: Subject to any disclaimer, the term of this patent is extended or adjusted under 35 U.S.C. 154(b) by 154 days.

(21) Appl. No.: 13/322,116

(22) PCT Filed: May 20, 2010

(86) PCT No.: PCT/KR2010/003198
§ 371 (c)(1),
(2), (4) Date: Nov. 22, 2011

(87) PCT Pub. No.: WO2010/137824
PCT Pub. Date: Dec. 2, 2010

(65) Prior Publication Data
US 2012/0069791 A1    Mar. 22, 2012

Related U.S. Application Data

(60) Provisional application No. 61/183,920, filed on Jun. 3, 2009, provisional application No. 61/182,751, filed on May 31, 2009, provisional application No. 61/180,855, filed on May 23, 2009.

(51) Int. Cl.
*H04W 72/04*    (2009.01)
*H04L 5/00*    (2006.01)
*H04W 72/12*    (2009.01)
*H04W 88/08*    (2009.01)

(52) U.S. Cl.
CPC ........ *H04W 72/1263* (2013.01); *H04W 88/085* (2013.01); *H04L 5/0053* (2013.01); *H04L 5/003* (2013.01)
USPC ........................................... 370/336; 370/315

(58) Field of Classification Search
None
See application file for complete search history.

(56) References Cited

U.S. PATENT DOCUMENTS

| | | | |
|---|---|---|---|
| 2003/0063678 A1* | 4/2003 | Crawford | 375/260 |
| 2005/0265280 A1 | 12/2005 | Roh et al. | |
| 2009/0046570 A1* | 2/2009 | Sarkar et al. | 370/203 |
| 2009/0046672 A1* | 2/2009 | Malladi et al. | 370/336 |
| 2010/0080139 A1* | 4/2010 | Palanki et al. | 370/252 |
| 2011/0096783 A1* | 4/2011 | Cai et al. | 370/395.4 |

FOREIGN PATENT DOCUMENTS

| | | |
|---|---|---|
| KR | 10-0350411 B1 | 8/2002 |
| KR | 10-2004-0106848 A | 12/2004 |
| KR | 10-2006-0048106 A | 5/2006 |
| KR | 10-0755537 B1 | 6/2007 |

OTHER PUBLICATIONS

LG Electronics, Resource Allocation and Downlink Control Channel Structure for Relay Backhaul Link, Published Mar. 27, 2009.*

* cited by examiner

*Primary Examiner* — Hassan Kizou
*Assistant Examiner* — Tejis Daya
(74) *Attorney, Agent, or Firm* — Birch, Stewart, Kolasch & Birch, LLP

(57) ABSTRACT

A method for transmitting a signal in a wireless communication system is provided. The method includes: allocating a radio resource for transmitting a signal; and transmitting the signal to a destination station by using the radio resource, wherein the radio resource includes a plurality of symbols in a time domain, at least two symbols among the plurality of symbols include a guard time for switching transmission and reception of a signal, and the radio resource includes a partial symbol which is a radio resource other than the guard time in the symbol including the guard time.

6 Claims, 32 Drawing Sheets

FIG. 17
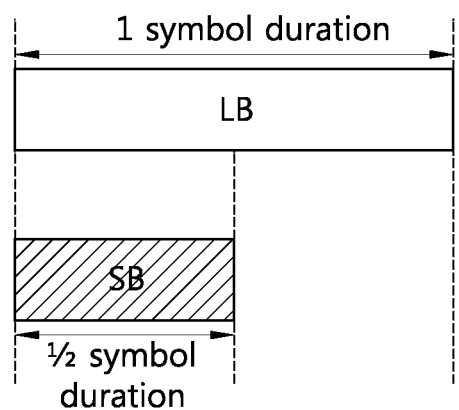
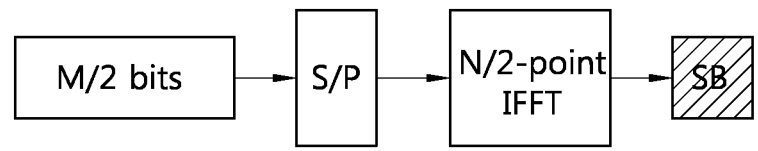
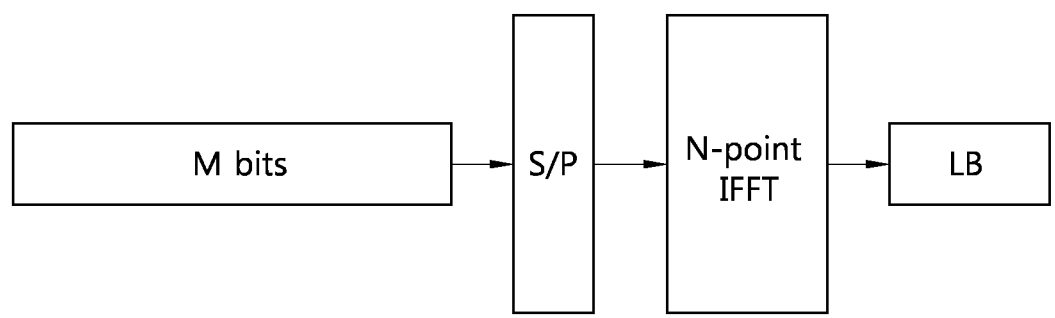

METHOD AND APPARATUS FOR TRANSMITTING A SIGNAL IN A WIRELESS COMMUNICATION SYSTEM

This application is the National Phase of PCT/KR2010/003198 filed on May 20, 2010, which claims priority under 35 U.S.C. 119(e) to US Provisional Application No(s). 61/180,855 filed on May 23, 2009, 61/182,751 filed on May 31, 2009 and 61/183,920 filed on Jun. 3, 2009, all of which are hereby expressly incorporated by reference into the present application.

TECHNICAL FIELD

The present invention relates to wireless communications, and more particularly, to a method and apparatus for transmitting a signal in a wireless communication system employing a relay station.

BACKGROUND ART

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

3rd generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LIE-advanced is one of promising candidates for the IMT-advanced. A technology related to a relay station is one of main technologies for the LTE-advanced.

A relay station (RS) is a device for relaying a signal between a base station (BS) and a user equipment (UE), and is used for cell coverage extension and throughput enhancement of a wireless communication system.

Many researches for a method of transmitting a signal between the BS and the RS are currently ongoing in the wireless communication employing the RS. A conventional method of transmitting a signal between the BS and the UE has a problem when a signal is transmitted between the BS and the RS.

In the conventional method of transmitting the signal between the BS and the UE, the UE transmits the signal through one entire subframe in a time domain. One reason of transmitting a signal by the UE through the entire subframe is to set a duration of each channel for transmitting a signal to the maximum extent possible in order to reduce instantaneous maximum power consumed by the UE.

However, there is a case where the RS cannot transmit or receive a signal through one entire subframe in the time domain. In general, the RS relays a signal with respect to a plurality of UEs, which results in frequent occurrence of switching between a reception (Rx) mode and a transmission (Tx) mode. Further, the RS can receive a signal from the BS or can transmit a signal to a relay UE at the same frequency band. Alternatively, the RS can receive a signal from the relay UE or can transmit a signal to the BS at the same frequency band. The switching between the Rx mode and the Tx mode requires a specific time (hereinafter referred to as a guard time) between an Rx-mode period and a Tx-mode period. During the guard time, the RS does not transmit or receive a signal in order to avoid inter-signal interference and to provide reliable operations.

Accordingly, there is a need for a method for transmitting a signal by utilizing a guard time in a wireless communication system employing an RS.

SUMMARY OF INVENTION

Technical Problem

The present invention provides a signal transmission method and apparatus capable of using a radio resource wasted in a wireless communication system and capable of minimizing interference that may occur when using the wasted radio resource.

Technical Solution

According to an aspect of the present invention, a method for transmitting a signal in a wireless communication system is provided. The method includes: allocating a radio resource for transmitting a signal; and transmitting the signal to a destination station by using the radio resource, wherein the radio resource includes a plurality of symbols in a time domain, at least two symbols among the plurality of symbols include a guard time for switching transmission and reception of the signal, and the radio resource includes a partial symbol which is a radio resource other than the guard time in the symbol including the guard time.

Advantageous Effects

According to the present invention, a signal can be transmitted by utilizing a symbol including a guard time required for switching transmission and reception of a relay station in a wireless communication system including the relay station. In addition, it is possible to remove an interference that may occur when transmitting a signal in the symbol including the guard time.

DESCRIPTION OF DRAWINGS

FIG. 17 shows a method of generating a short block.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3$^{rd}$ partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advance (LTE-A) is an evolution of the 3GPP LTE. For clarity, the following description will focus on the 3GPP LTE/LTE-A. However, technical features of the present invention are not limited thereto.

Figure 1:
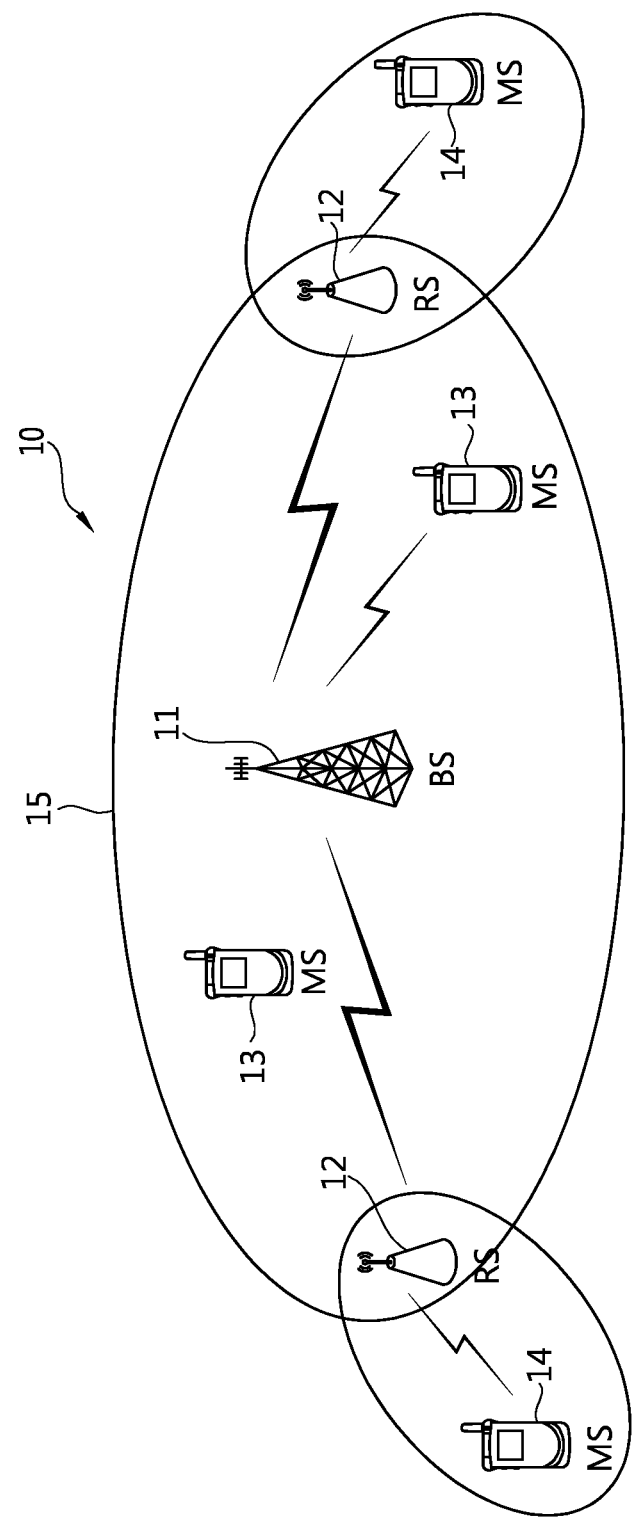
FIG. 1 shows a wireless communication system employing a relay station.

FIG. 1 shows a wireless communication system employing a relay station (RS).

Referring to FIG. 1, a wireless communication system 10 employing an RS includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a user equipment (UE) 13 and may be referred to as another terminology, such as an evolved node-B (eNB), a base transceiver system (BTS), an access point, an access network (AN), etc. The BS 11 can perform functions such as connectivity between an RS 12 and a UE 14, management, control, resource allocation, etc.

The RS 12 is a device for relaying a signal between the BS 11 and the UE 14, and is also referred to as another terminology such as a relay node (RN), a repeater, a relay, etc. A relay scheme used in the RS may be either amplify and forward (AF) or decode and forward (DF), and the technical features of the present invention are not limited thereto.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc. Hereinafter, a macro UE (or Ma UE) 13 denotes a UE that directly communicates with the BS 11, and a relay UE (or Re UE) 14 denotes a UE that communicates with the RS. Even if the Ma UE 13 exists in a cell of the BS 11, the Ma UE 13 can communicate with the BS 11 via the RS 12 to improve a data transfer rate depending on a diversity effect.

Hereinafter, a link between the BS 11 and the Ma UE 13 is referred to as a macro link. The macro link can be divided into a macro downlink (M-DL) and a macro uplink (M-UL). The M-DL denotes communication from the BS 11 to the Ma UE 13. The M-UL denotes communication from the Ma UE 13 to the BS 11.

The link between the BS 11 and the RS 12 is referred to as a backhaul link. The backhaul link can be divided into a backhaul downlink (B-DL) and a backhaul uplink (B-UL). The B-DL denotes communication from the BS 11 to the RS 12. The B-UL denotes communication from the RS 12 to the BS 11.

A link between the RS 12 to the Re UE 14 is referred to as an access link. The access link can be divided into an access downlink (A-DL) and an access uplink (A-UL). The A-DL denotes communication from the RS 12 to the Re UE 14. The A-UL denotes communication from the Re UE 14 to the RS 12.

The wireless communication system 10 employing the RS is a system supporting bidirectional communication. The bidirectional communication may be performed by using a time division duplex (TDD) mode, a frequency division duplex (FDD) mode, etc. When in the TDD mode, different time resources are used in UL transmission and DL transmission. When in the FDD mode, different frequency resources are used in UL transmission and DL transmission.

Figure 2:
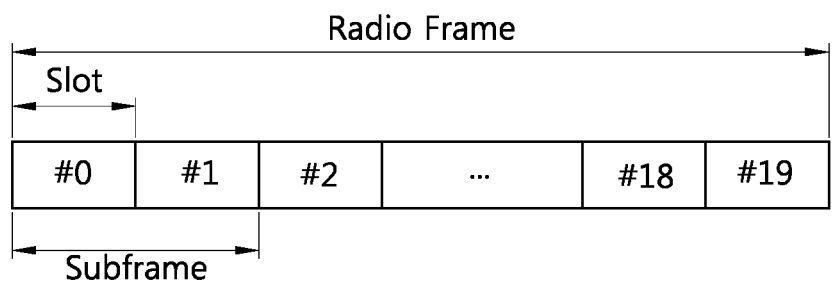
FIG. 2 shows a radio frame structure of $3^{rd}$ generation partnership project (3GPP) long term evolution (LTE).

FIG. 2 shows a radio frame structure of 3GPP LTE.

Referring to FIG. 2, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in a time domain. Since the 3GPP LTE uses OFDMA in DL transmission, the OFDM symbol is for representing one symbol period, and can be referred to as other terms. For example, the OFDM symbol can also be referred to as an SC-FDMA symbol when SC-FDMA is used as a UL multiple-access scheme. Although it is described herein that one slot includes 7 OFDM symbols, the number of OFDM symbols included in one slot may change depending on a cyclic prefix (CP) length. According to 3GPP TS 36.211 V8.5.0(2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

The sections 4.1 and 4.2 of 3GPP TS 36.211 V8.3.0 (2008-05) "Technical Specification Group Radio Access Network; Evolved Universal Terrestrial Radio Access (E-UTRA); Physical Channels and Modulation (Release 8)" can be incorporated herein by reference to explain the radio frame structure described with reference to FIG. 2.

Figure 3:
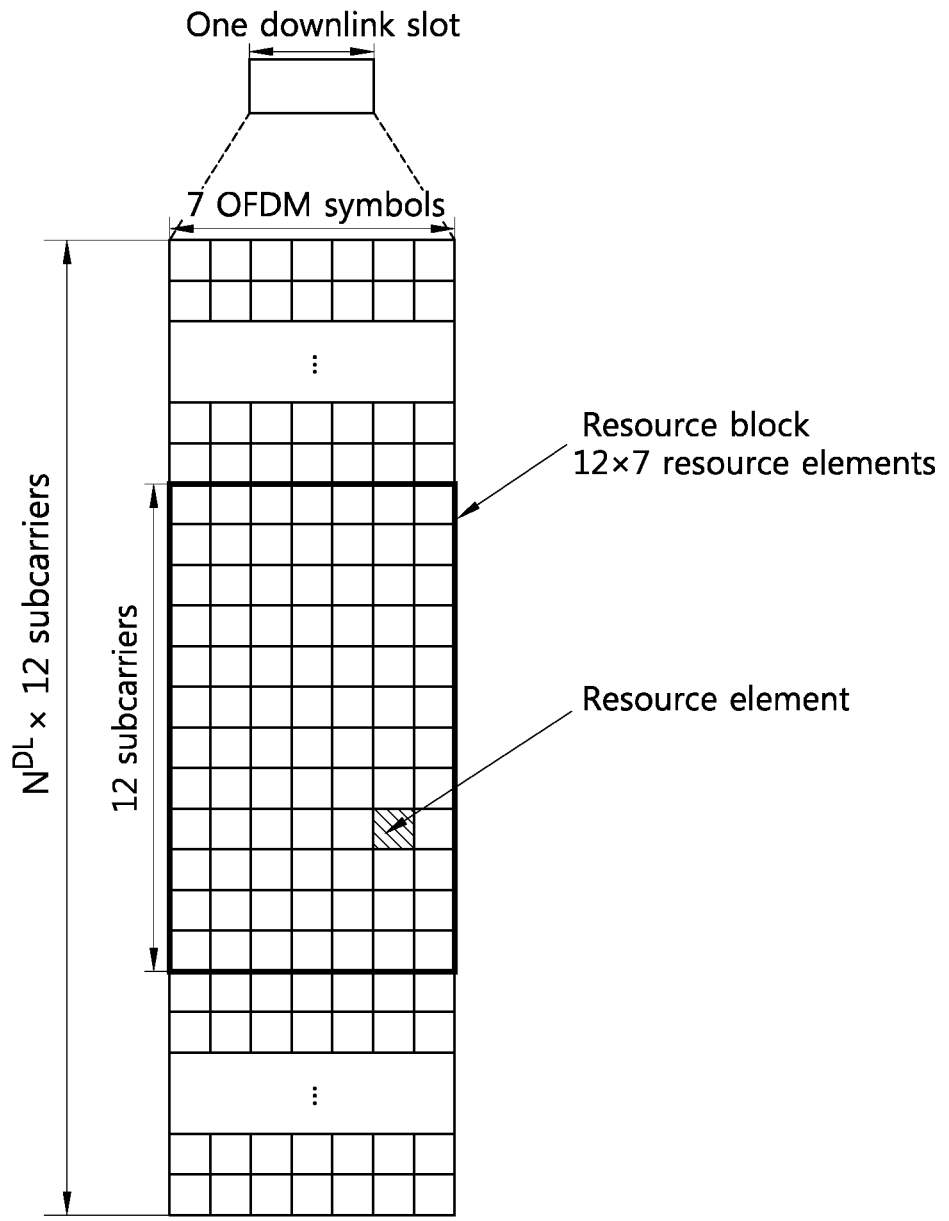
FIG. 3 shows an example of a resource grid for one downlink slot.

FIG. 3 shows an example of a resource grid for one DL slot.

In FDD and TDD radio frames, one slot includes a plurality of OFDM symbols in a time domain and a plurality of resource blocks (RBs) in a frequency domain. Hereinafter, the symbol may imply one OFDM symbol or one SC-FDMA symbol. The RB is a resource allocation unit, and includes a plurality of consecutive subcarriers in one slot.

Referring to FIG. 3, a slot (e.g., a DL slot included in a DL subframe) includes a plurality of OFDM symbols in the time domain. It is described herein that one DL slot includes 7 OFDM symbols and one RB includes 12 subcarriers in the frequency domain for exemplary purposes only, but the present invention is not limited thereto. A subcarrier spacing may be, for example, 15 kHz in the RB.

Each element on the resource grid is referred to as a resource element, and one RB includes 12×7 resource elements. The number $N^{DL}$ of RBs included in the DL slot depends on a DL transmission bandwidth determined in a cell. The resource grid described in FIG. 3 can also apply to UL transmission.

Figure 4:
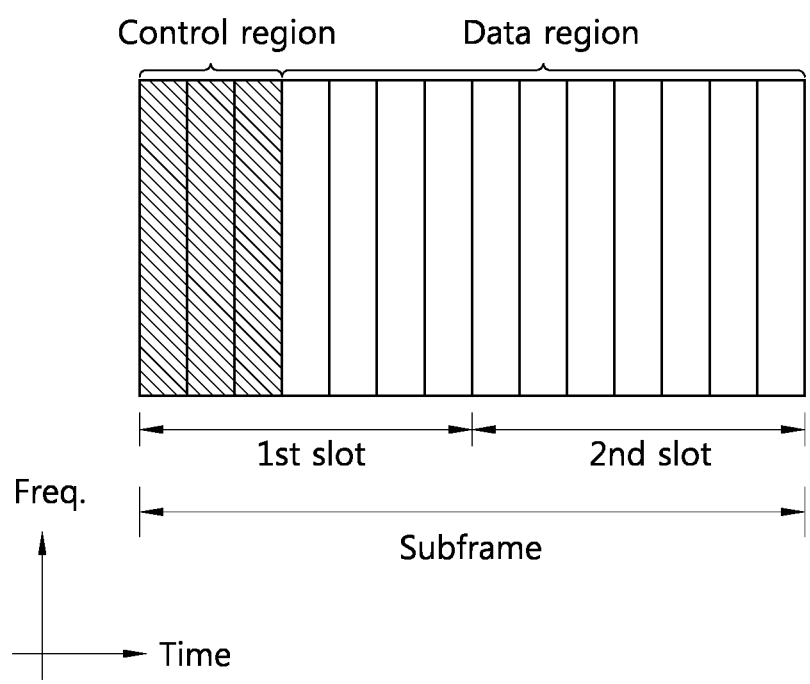
FIG. 4 shows a structure of a downlink subframe.

FIG. 4 shows a structure of a DL subframe.

Referring to FIG. 4, the subframe includes two consecutive slots. A maximum of three OFDM symbols located in a front portion of a $1^{st}$ slot within the subframe correspond to a control region to be assigned with a physical downlink control channel (PDCCH). The remaining OFDM symbols correspond to a data region to be assigned with a physical downlink shared channel (PDSCH). In addition to the PDCCH, control channels such as a physical control format indicator channel (PCFICH), a physical hybrid automatic repeat request (HARQ) indicator channel (PHICH), etc., can be assigned to the control region. A UE can read data information transmitted through the PDSCH by decoding control information transmitted through the PDCCH. Although the control region includes three OFDM symbols herein, this is for exemplary purposes only. Thus, two OFDM symbols or one OFDM symbol may be included in the control region The number of OFDM symbols included in the control region of the subframe can be known by using the PCFICH.

The control region consists of a plurality of control channel elements (CCEs), that is, a logical CCE stream. Hereinafter, the CCE stream denotes a set of all CCEs constituting the control region in one subframe. The CCE corresponds to a plurality of resource element groups. For example, the CCE may correspond to 9 resource element groups. The resource element group is used to define mapping of a control channel onto a resource element. For example, one resource element group may consist of four resource elements.

A plurality of PDCCHs may be transmitted in the control region. The PDCCH carries control information such as scheduling allocation. The PDCCH is transmitted on an aggregation of one or several consecutive CCEs. A PDCCH format and the number of available PDCCH bits are determined according to the number of CCEs constituting the CCE aggregation. Hereinafter, the number of CCEs used for PDCCH transmission is referred to as a CCE aggregation level. The CCE aggregation level is a CCE unit for searching for the PDCCH. A size of the CCE aggregation level is defined by the number of contiguous CCEs. For example, the CCE aggregation level may be an element of {1, 2, 4, 8}.

Control information transmitted through the PDCCH is referred to as downlink control information (hereinafter, DCI). The DCI includes uplink scheduling information, downlink scheduling information, system information, an uplink power control command, control information for paging, control information for indicating a random access channel (RACH) response, etc.

Examples of a DCI format include a format 0 for scheduling of a physical uplink shared channel (PUSCH), a format 1 for scheduling of one physical downlink shared channel (PDSCH) codeword, a format 1A for compact scheduling of the one PDSCH codeword, a format 1B for simple scheduling for rank-1 transmission of a single codeword in a spatial multiplexing mode, a format 1C for significantly compact scheduling of a downlink shared channel (DL-SCH), a format 1D for scheduling of the PDSCH in a multi-user spatial multiplexing mode, a format 2 for scheduling of the PDSCH in a closed-loop spatial multiplexing mode, a format 2A for scheduling of the PDSCH in an open-loop spatial multiplexing mode, a format 3 for transmission of a transmission power control (TPC) command for 2-bit power control for the PUCCH and the PUSCH, and a format 3A for transmission of a TPC command for 1-bit power control for the PUCCH and the PUSCH.

Figure 5:
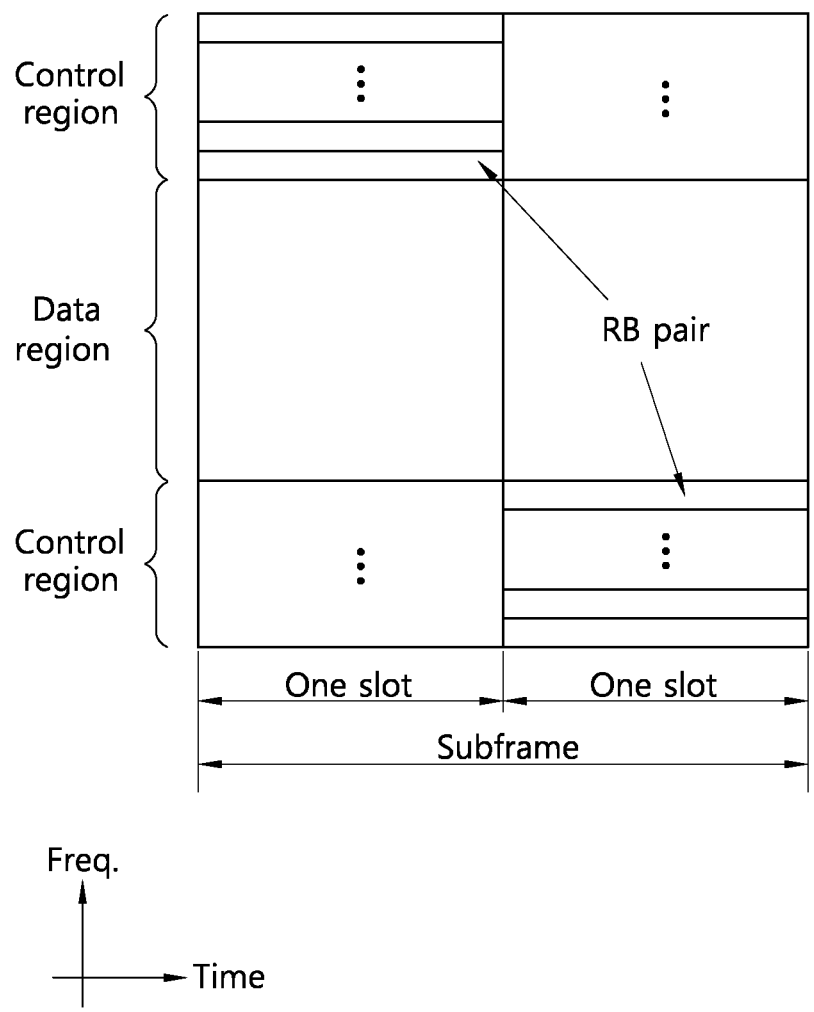
FIG. 5 shows an uplink subframe structure.

FIG. 5 shows a UL subframe structure.

Referring to FIG. 5, a UL subframe can be divided into a control region and a data region. The control region is a region in which a physical uplink control channel (PUCCH) for carrying UL control information is allocated. The data region is a region in which a physical uplink shared channel (PUSCH) for carrying user data is allocated.

The PUCCH for one UE is allocated in a pair of RBs 51 and 52. The RBs 51 and 52 belonging to the RB pair occupy different subcarriers in each of two slots. This is called that the RB pair allocated to the PUCCH is frequency-hopped in a slot boundary.

The PUCCH can support multiple formats. That is, UL control information having a different number of bits for each subframe can be transmitted according to a modulation scheme. For example, when using a binary phase shift keying (BPSK) (i.e., a PUCCH format 1a), 1-bit UL control information can be transmitted over the PUCCH, and when using quadrature phase shift keying (QPSK) (i.e., a PUCCH format 1b), 2-bit UL control information can be transmitted over the PUCCH. In addition thereto, examples of the PUCCH format include a format 1, a format 2, a format 2a, a format 2b, etc. For this, the section 5.4 of 3GPP TS 36.211 V8.2.0 (2008-03) "Technical Specification Group Radio Access Network; Evolved Universal Terrestrial Radio Access (E-UTRA); Physical Channels and Modulation (Release 8)" can be incorporated herein by reference.

Figure 6:
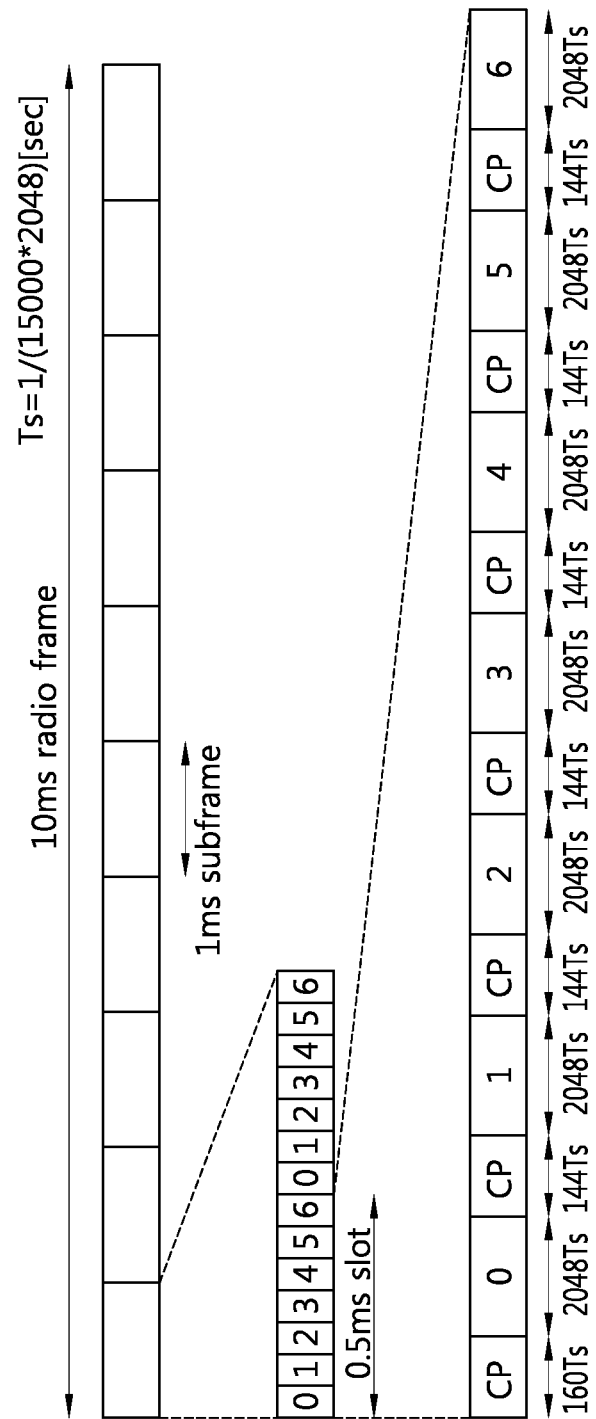
FIG. 6 shows an example of inserting a cyclic prefix (CP) to an orthogonal frequency division multiplexing (OFDM) symbol.

FIG. 6 shows an example of inserting a cyclic prefix (CP) to an OFDM symbol.

Referring to FIG. 6, in case of a normal CP, a time period in which the normal CP is inserted may be 160 Ts in a first symbol of a subframe and may be 144 Ts in the remaining symbols (where Ts=1/(15000*2048)sec). The CP is obtained by copying a last part of a symbol and then adding it to a first part. The CP is used to avoid inter-symbol interference.

Figure 7:
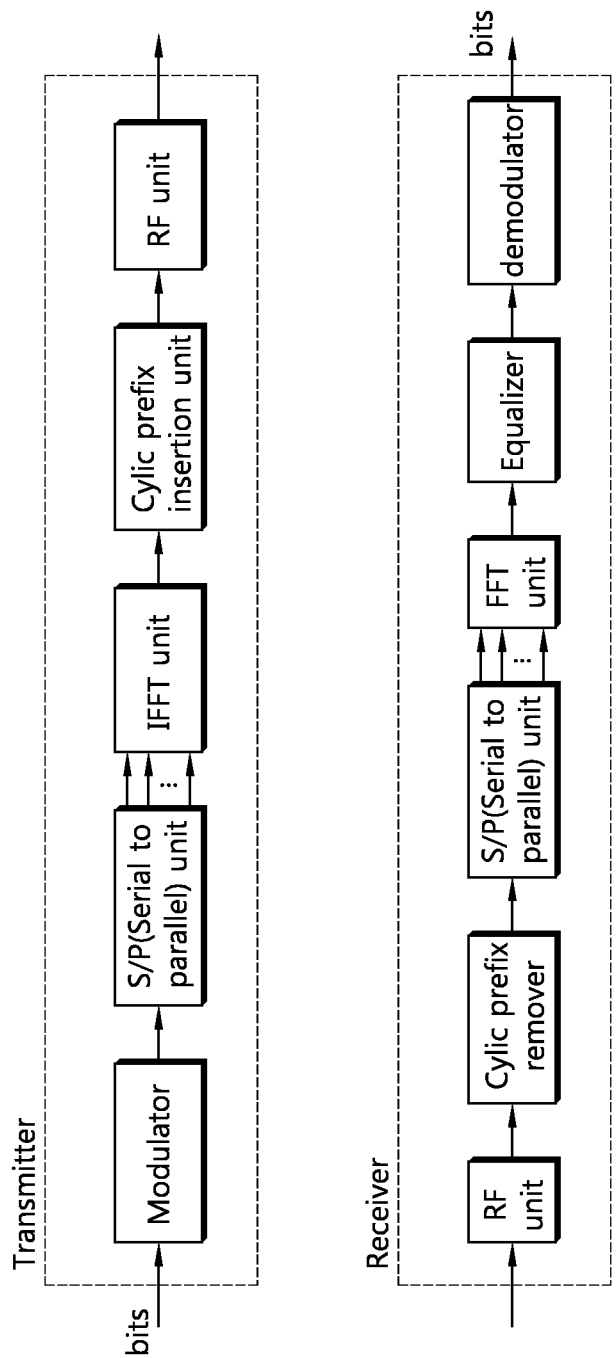
FIG. 7 shows exemplary structures of an OFDM transmitter and an OFDM receiver.

FIG. 7 shows exemplary structures of an OFDM transmitter and an OFDM receiver.

The OFDM transmitter modulates to-be-transmitted information bits by using a modulator, and thereafter inputs the modulated information bits to an S/P unit that converts a serial signal into a parallel signal. The modulation can use various modulation schemes such as quadrature phase shift keying (QPSK), m-quadrature amplitude modulation (QAM), etc.

The parallel signal converted by the S/P unit becomes a signal having a period longer than that of channel delay spread. The parallel signal is input to an inverse fast Fourier transform (IFFT) that expresses a frequency-domain signal in the form of a time-domain signal. Thereafter, the parallel signal is subjected to IFFT and CP insertion, and is then transmitted through a radio frequency (RF) unit. The RF unit includes at least one antenna.

The OFDM receiver receives a radio signal by using an RF unit, removes a CP by using a CP remover, and then converts a serial signal into a parallel signal by using an S/P unit. The converted parallel signal is subjected to FFT by using an FFT unit. The FFT expresses a time-domain signal in the form of a frequency-domain signal. The frequency-domain signal is restored into data via an equalizer and a demodulator. The equalizer multiplies each subcarrier by an estimated channel response to remove a channel influence on each subcarrier. The demodulator demodulates data according to a demodulation scheme corresponding to the modulation scheme used in the modulator.

In the present invention, the OFDM transmitter may be a part of a BS or RS. The OFDM receiver may be a part of the RS or BS.

When the wireless communication system includes the RS, it is assumed that it is difficult for the RS to transmit a signal while receiving a signal at the same frequency band. Therefore, the RS receives or transmits a signal of the same frequency band at a different time. For example, the RS may receive a signal from the BS in a subframe #n and transmit a signal to an Re UE in a subframe #n+1.

However, in case of switching transmission/reception of a signal, such as in a case where the RS receives a signal while transmitting a signal of the same frequency band, or the RS transmits a signal while receiving a signal of the same frequency band, a guard time is required between a transmission period and a reception period of the signal. The guard time is a time required to generate a signal that satisfies system reliability, protection, or requirements required by a system. For example, the guard time may include a transient time for operation reliability of a power amplifier that amplifies a signal.

Figure 8:
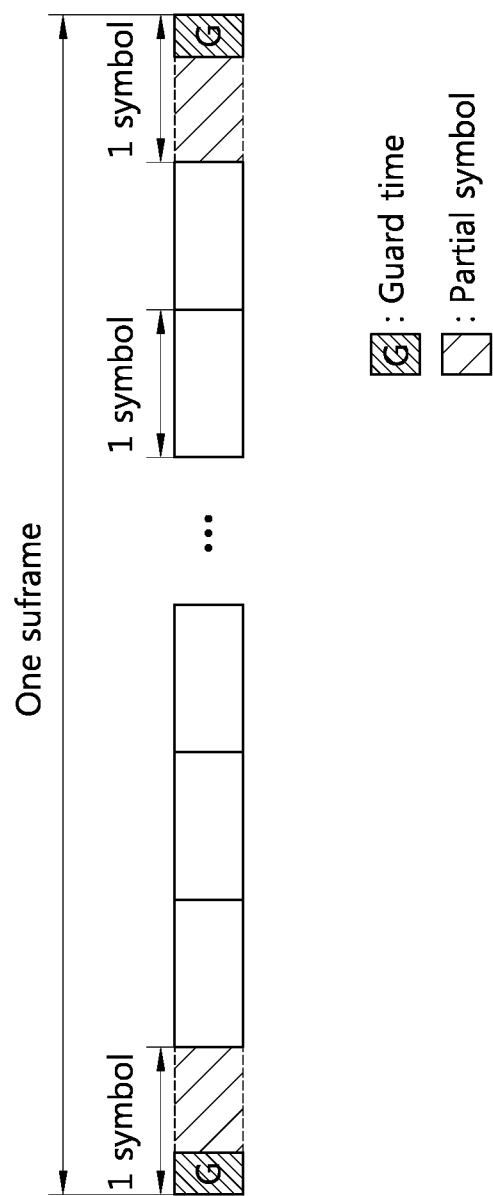
FIG. 8 and FIG. 9 show examples in which a guard time is located in a subframe.
Figure 9:
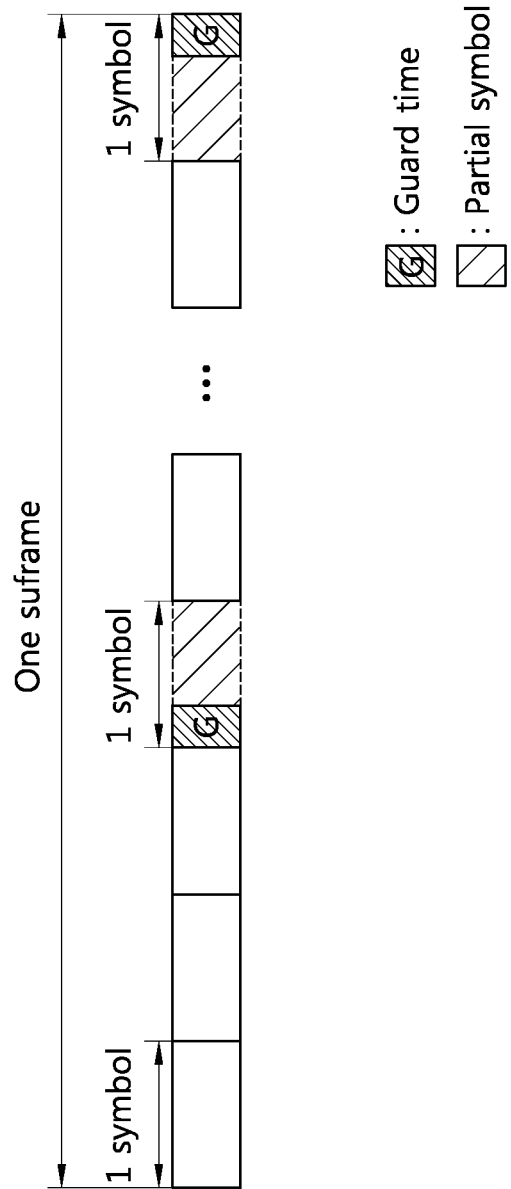

FIG. 8 and FIG. 9 show examples in which a guard time is located in a subframe.

Referring to FIG. 8, each of two guard times is located in an edge of a subframe. That is, a first symbol and a last symbol of the subframe include the guard times. The guard time may be located in a symbol other than the symbol located in the edge of the subframe. In FIG. 9, one of the two guard times is located in an intermediate symbol of a subframe, that is, in a symbol other than the symbol located in the edge of the subframe. Although the location of the guard time is for a case where scheduling is performed on a subframe basis in the example above, the present invention is not limited thereto. That is, if scheduling is performed on a slot basis, the guard time can be located in an edge of a last or an intermediate symbol of the slot (hereinafter, the same is also true). The guard time may be a time period less than one symbol. The remaining parts other than the guard time in one symbol are referred to as a partial symbol.

Figure 10:
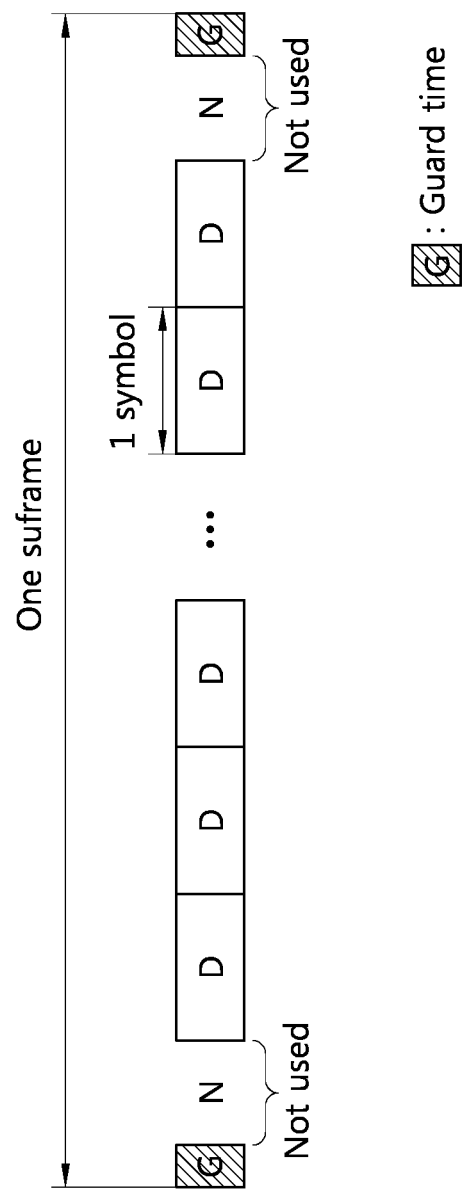
FIG. 10 shows the conventional method of data transmission in a subframe including a guard time.

FIG. 10 shows the conventional method of data transmission in a subframe including a guard time.

It is difficult to transmit data in the guard time. In a case where the guard time is located in a symbol located in an edge of a subframe as shown in FIG. 10, the symbol is wasted and even a partial symbol other than the time period is unused in data transmission. For example, in case of a normal CP in LTE, the subframe includes 14 symbols, and in case of an extended CP, the subframe includes 12 symbols. Among them, two symbols cannot be used due to the guard time. If scheduling is performed on a slot basis, two slots may be unused due to the guard time in one slot, and four symbols may be unused due to the guard time in one subframe. Therefore, there is a need for a method for utilizing a symbol including a guard time in signal transmission.

Figure 11:
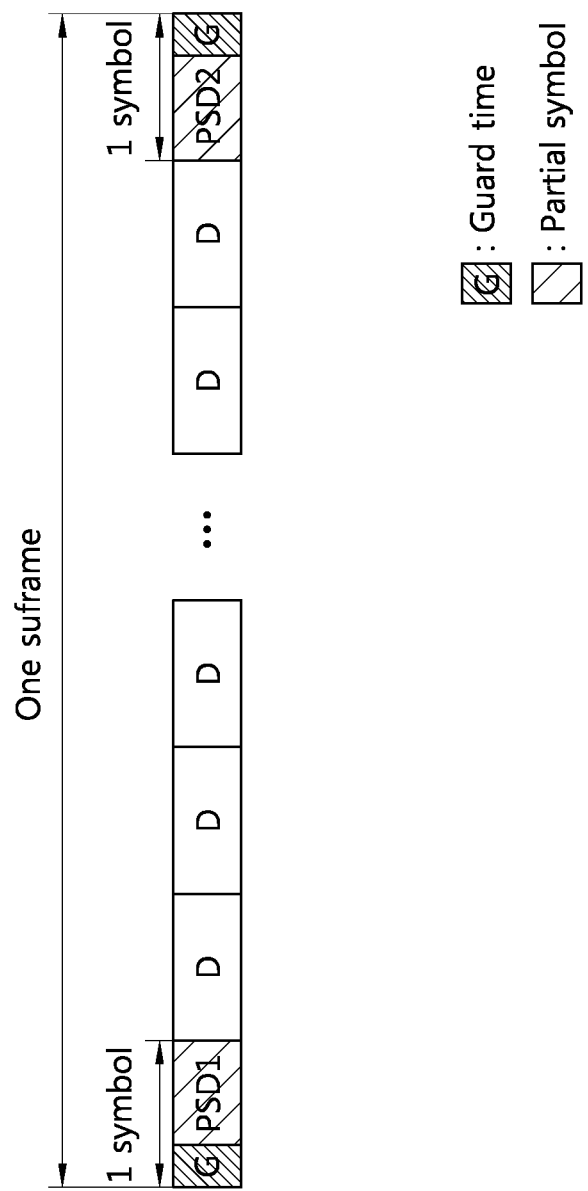
FIG. 11 shows an example of transmitting different data in two symbols each including a guard time.

FIG. 11 shows an example of transmitting different data in two symbols each including a guard time.

As shown in FIG. 11, different data can be transmitted by carrying it on two partial symbols (as described above, a period other than a guard time in a symbol including the guard time is called a partial symbol).

If data carried in a first partial symbol is called PSD1 and data carried on a second partial symbol is called PSD2, then the PSD1 and the PSD2 may be different data. If the guard time is short to the extent that it can be ignored in comparison with a symbol period, the PSD1 and the PSD2 can be properly demodulated.

The PSD1 and the PSD2 may need to perform stronger channel coding than other symbols to satisfy an error rate required in a system. For this, a resource allocation rule having a new format capable of performing transmission by using symbol-basis channel coding can be defined. Alternatively, an additional coding gain can be obtained by repeating the PSD1 and the PSD2 in a channel coding process. Since more coding processes are required in the PSD1 and the PSD2, the error rate generated in a demodulation process can be decreased.

As such, in a case where different data is transmitted in different partial symbols, it is preferable to assign different symbol indices to symbols including the respective partial symbols. In addition, regarding a symbol including each partial symbol, a last symbol index of a subframe may be assigned in sequence by considering a fact that the channel coding or the resource allocation rule may be different in comparison with another symbol. For example, in case of a normal CP, symbol indices are assigned in an ascending order to up to a $13^{th}$ symbol in such a manner that a symbol index #0 is assigned to a second symbol of a subframe and a symbol index #1 is assigned to a third symbol, and then a symbol index #12 is assigned to a first symbol of the subframe and a symbol index #13 is assigned to a last symbol. According to such a symbol indexing method, data is transmitted/received in the same manner as the conventional method with respect to the symbol indices #0 to #11, and a data transmission/reception method different from the conventional method can be applied with respect to the symbol indices #12 and #13 of the subframe.

Hereinafter, a method of transmitting data in an repetitional manner in two symbols each including a guard time is described.

Figure 12:
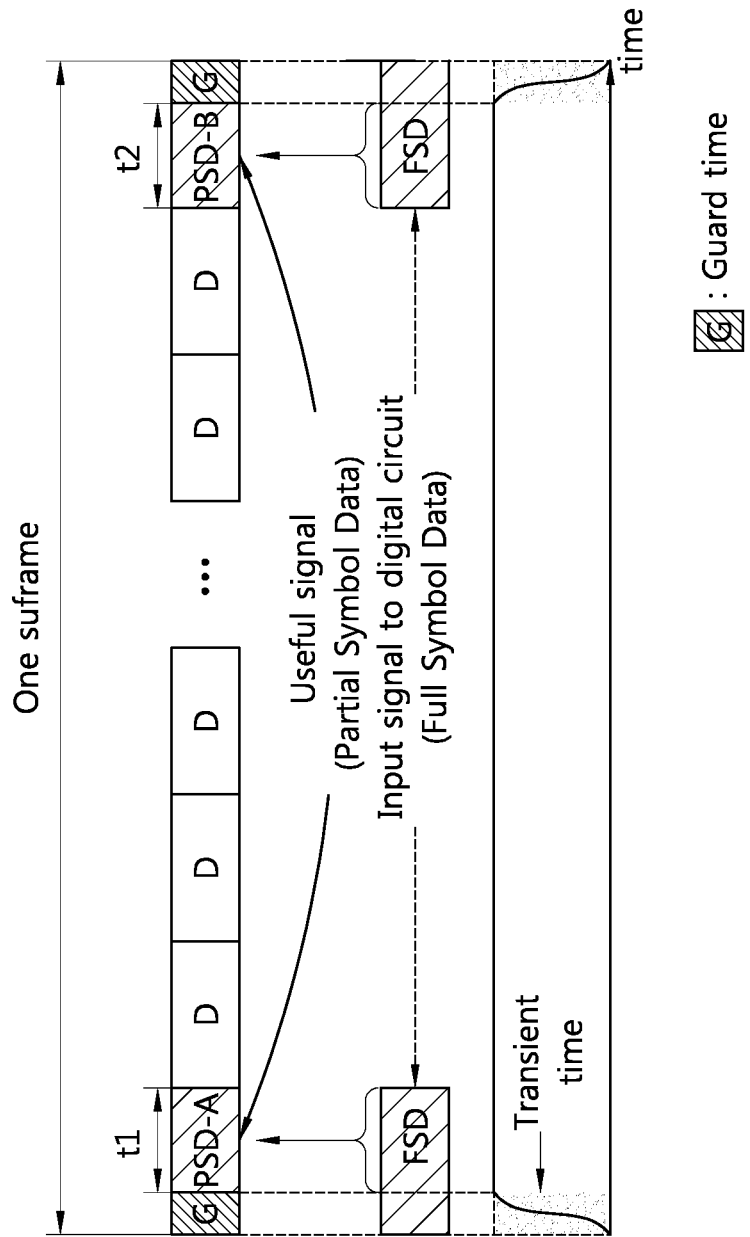
FIG. 12 shows an example of transmitting data in a repetitional manner in two symbols each including a guard time.

FIG. 12 shows an example of transmitting data in an repetitional manner in two symbols each including a guard time.

Referring to FIG. 12, the guard time may be included in first and last symbols of a subframe. For convenience, data transmitted in a partial symbol of the first symbol is referred to as PSD-A, and data transmitted in a partial symbol of the last symbol is referred to as PSD-B. In addition, 1-symbol data transmitted in one symbol is referred to as full symbol data (FSD). Then, the PSD-A and the PSD-B may be a part of the FSD which is 1-symbol data. The PSD-A may correspond to a rear part of the FSD, and the PSD-B may correspond to a front part of the FSD. In general, the FSD consists of a CP and data, in that order. The CP is a cyclical copy of the rear part of the data. Therefore, the PSD-A and the PSD-B are identical in that a part of data is cyclically copied. In this sense, a symbol in which the PSD-A or the PSD-B is transmitted can be called a cyclic-copied symbol. Repetitional transmission of data in two symbols each including a guard time can be divided into two methods as follows.

1) In a first method, data is transmitted in a partial symbol and a guard time, that is, in the entire symbol including the guard time. That is, in a symbol including a guard time located in an edge of a subframe, a transmitter applies a signal in the entire symbol even if it is the guard time, and amplifies and transmits the signal. Since data is carried and transmitted even in the guard time, the data may be distorted in the guard time. However, implementation is highly convenient since a signal is transmitted through the same processing as a symbol not having the guard time. For example, in a first symbol, the guard time is located in a front part of the symbol, and thus data carried in the front part of the symbol may be distorted. On the other hand, in a last symbol, the guard time is located in the rear part of the symbol, and thus data carried on the rear part of the symbol may be distorted.

2) In a second method, data is transmitted only in a partial symbol of a symbol including a guard time. That is, data is not transmitted in the guard time, and is transmitted by using a part of the entirety of the partial symbol. The second method will be described in greater detail with reference to FIG. 13.

Figure 13:
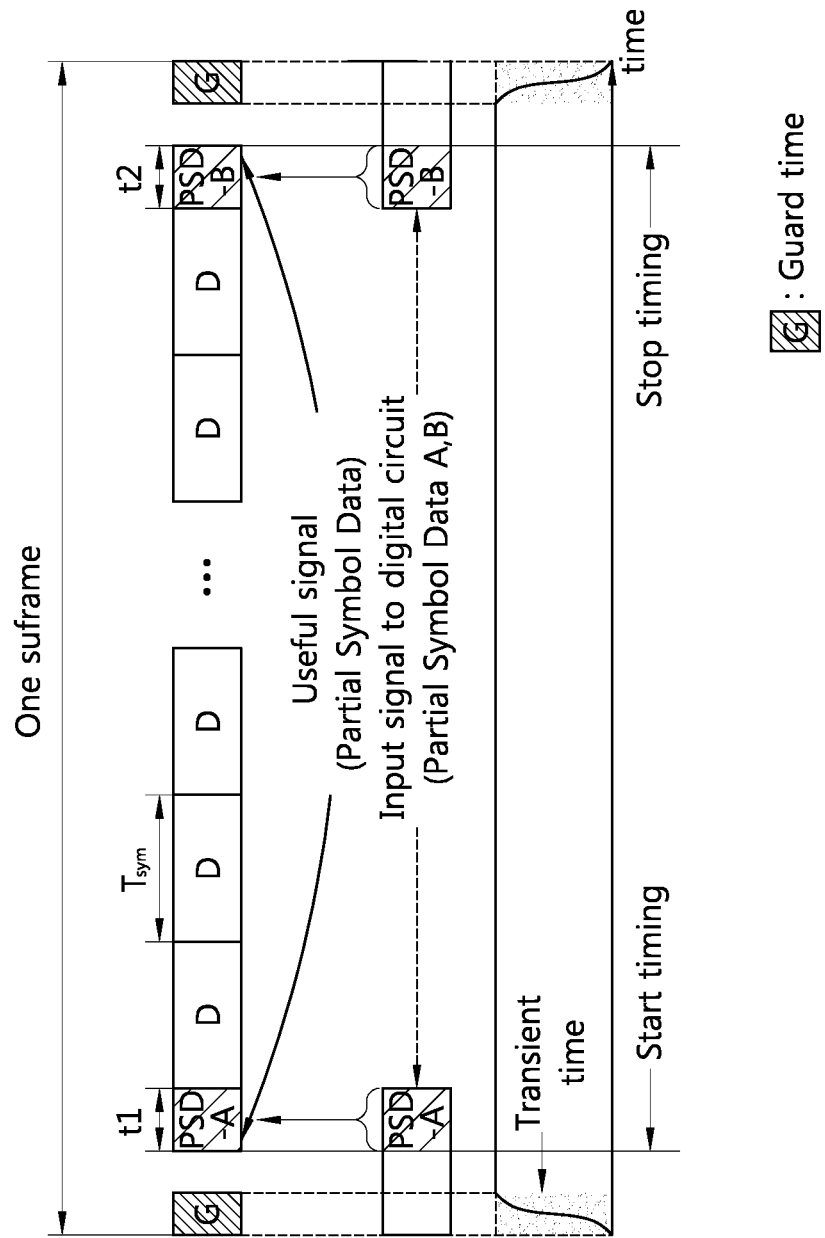
FIG. 13 shows an example of transmitting data in a repetitional manner only in a partial symbol of two symbols each including a guard time.

FIG. 13 shows an example of transmitting data in an repetitional manner only in a partial symbol of two symbols each including a guard time.

Referring to FIG. 13, in a symbol including a guard time, data is transmitted only in a partial symbol. In this case, a signal may be transmitted by applying the signal from a specific point of the partial symbol, or may be transmitted by applying the signal only to the specific point of the partial symbol. Since data in the guard time is distorted, carrying the data in the guard time has no significant meaning. Therefore, data is transmitted starting from a specific point of a partial symbol in which data distortion does not occur.

For example, data transmitted in a first symbol of a subframe is generated by applying it by a time t1 in a partial symbol of a first symbol. Data transmitted in a last symbol is generated by applying it by a time t2 in a partial symbol of a last symbol. In FIG. 13, PSD-A may include a rear part of 1-symbol data, and PSD-B may include a front part of the 1-symbol data. Although the PSD-A and the PSD-B are generated from the same 1-symbol data, the contents thereof may be different from each other since they respectively correspond to the rear and front parts of the 1-symbol data.

t1 and t2 may be determined variously according to a demodulation scheme of an OFDM receiver. For example, t1 and t2 may be $t1=t2=(1/2)*T_{sym}$ when one symbol period is $T_{sym}$. Alternatively, $t1 \geq (1/2)T_{sym}$, $t2 \geq (1/2)T_{sym}$. For correct signal restoration in a demodulation process of the OFDM receiver, t1 and t2 may be determined to $((1/2)*T_{sym}+CP$ length) by considering a CP of each symbol.

Figure 14:
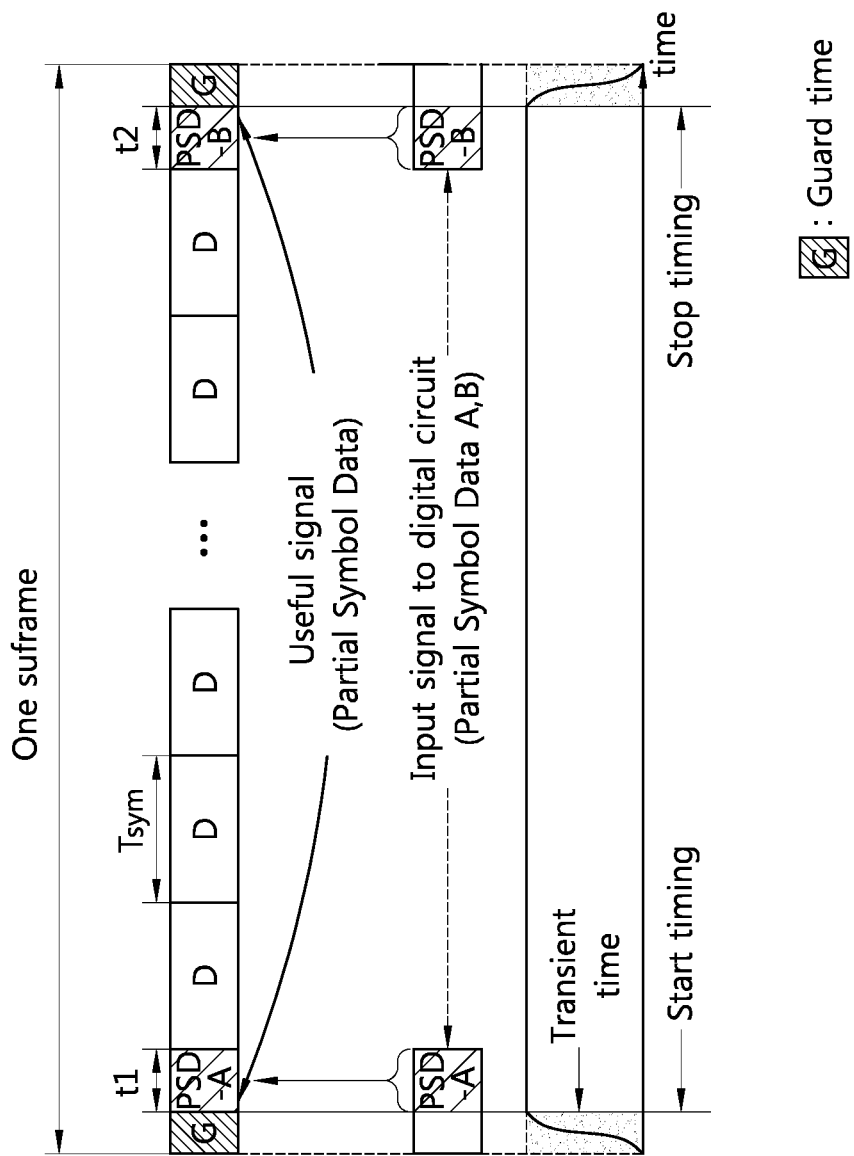
FIG. 14 shows another example of transmitting data in a repetitional manner in a partial symbol of two symbols each including a guard time.

FIG. 14 shows another example of transmitting data in a repetitional manner in a partial symbol of two symbols each including a guard time.

Referring to FIG. 14, t1 and t2 may be determined to a period excluding the guard time from $T_{sym}$. In this case, it is possible to use a method in which data is transmitted by allocating the data to the entire partial symbol in an OFDM transmitter and a required part is selected and combined in an OFDM receiver.

If 1-symbol data can be restored, t1 and t2 can be determined independently.

Figure 15:
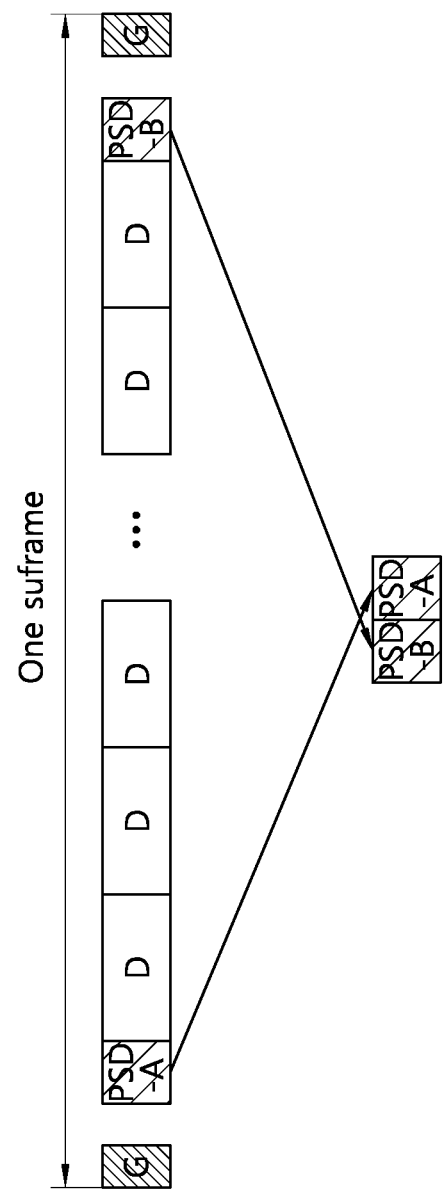
FIG. 15 shows an example of combining data of a partial symbol in a demodulation process of an OFDM symbol.

FIG. 15 shows an example of combining data of a partial symbol in a demodulation process of an OFDM symbol.

In the demodulation process of the OFDM receiver, 1-symbol data can be restored by combining the data in the order of PSD-B and PSD-A. In this case, the combination of the PSD-B and the PSD-A is preferably performed in a previous stage of an FFT unit. That is, in comparison with a case of combining the partial symbols after performing an FFT process and demodulation, it is preferable to restore one symbol after combining received radio signals first and then performing an FFT process.

Now, a method of assigning a symbol index in a subframe including a guard time will be described.

Figure 16:
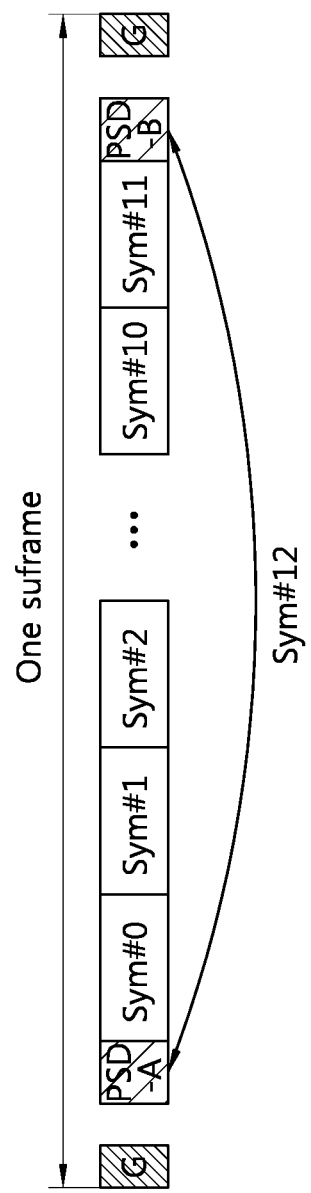
FIG. 16 shows an example of assigning a symbol index in a subframe including a guard time.

FIG. 16 shows an example of assigning a symbol index in a subframe including a guard time.

In case of using a normal CP in LTE, first, second, . . . , last symbols of the subframe have indices 0, 1, . . . , 13. The first or last symbol including the guard time may (or may not) transmit data. That is, data may not be transmitted in the first symbol and the last symbol by puncturing the symbols similarly to the conventional method or data may be transmitted according to the present invention. As such, since a symbol including a guard time can be used for a special purpose, a last available symbol index can be allocated instead of assigning 0 to an index of the first symbol.

For example, in case of a normal CP, symbol indices can be assigned in an ascending order to up to a $13^{th}$ symbol in such a manner that a symbol index #0 is assigned to a second symbol of a subframe and a symbol index #1 is assigned to a third symbol, and thereafter a partial symbol of the first symbol and a partial symbol of a last symbol are combined into one symbol and then a last symbol index #12 is assigned.

According to such a symbol indexing method, the conventional method in which interleaving, puncturing, mapping, or the like is performed according to a symbol index can be used without alternation. However, a signal transmission method of the present invention can be applied only to a symbol having a last symbol index. If the signal transmission method of the present invention is not applied, in a case where an RS cannot use two symbols including a guard time in a backhaul link, data can be transmitted by puncturing the unusable symbol. In a normal CP, the RS can transmit data by puncturing the two symbols each including the guard time and by using 12 symbols. Even if the guard time is present in a subframe, 14 symbols may be all used by ignoring the guard time, and in this case, the RS may perform transmission without puncturing the symbol.

Hereinafter, a method of transmitting data by using a short block (SB) in a symbol including a guard time will be described. Herein, the SB implies a resource block having a shorter length in a time domain and having a wider subcarrier spacing in a frequency domain than those of a normal resource block. Hereinafter, the normal resource block is referred to as a long block (LB) as opposed to the SB.

FIG. 17 shows a method of generating an SB.

The SB can consist of a ½ time period of an LB. That is, if a time period of the LB is denoted by T, a time period of the SB may be T/2. In this case, comparing a subcarrier spacing in a frequency domain with the LB, the LB is 15 kHz and the SB is 30 kHz. The number of bits that can be transmitted by the SB may be ½ of the LB. When the LB is generated by using N-point IFFT, the SB can be generated by using N/2-point IFFT. Although the SB consists of a ½ time period of the LB in general, the present invention is not limited thereto. According to a guard time in a symbol, the SB can consist of a ⅔ time period of the LB (or 8 subcarriers in the frequency domain).

Figure 18:
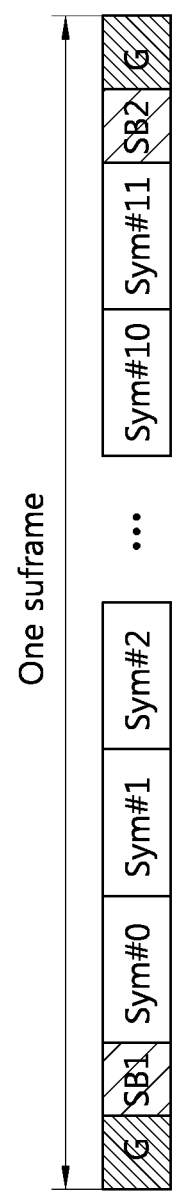
FIG. 18 shows an example of allocating a short block to a symbol including a guard time.

FIG. 18 shows an example of allocating an SB to a symbol including a guard time.

Referring to FIG. 18, SBs (i.e., SB1 and SB2) can be used by allocating them to a partial symbol of a first or last symbol. Data that can be transmitted in a symbol not including a guard time can be divided by half, and one half of the data can be transmitted through the SB1 and the other half can be transmitted through the SB2. When an OFDM receiver receives the SB1 and the SB2 and then combines the SB1 and the SB2, this has the same result as when data transmitted in one symbol is received. Therefore, the number of symbols wasted due to the guard time can be decreased by one.

Even in a case of using an SB, it is preferable to allocate a last symbol index of a subframe to a symbol configured with SB1+SB2. Instead of allocating an index '0' to a first symbol of a subframe, the index '0' is allocated to a second symbol. Thereafter symbol indices are allocated in an ascending order starting from a third symbol. One symbol is configured by combining an SB symbol SB1 included in the first symbol of the subframe and an SB symbol SB2 included in the last symbol, and a symbol index '12' is allocated to the configured symbol.

Figure 19:
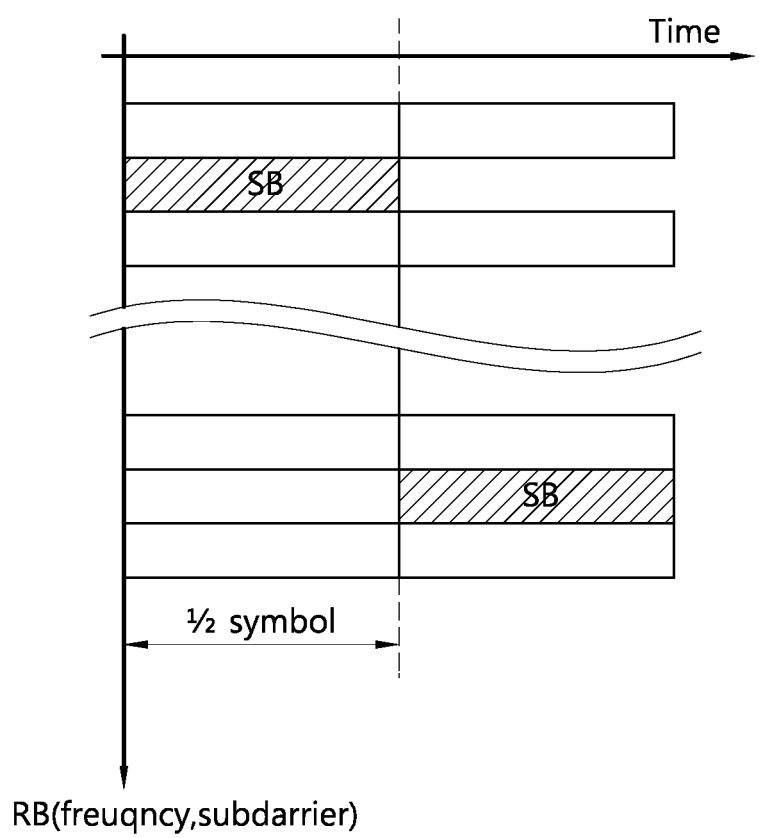
FIG. 19 shows an exemplary location of a radio resource to which a short block can be allocated.

FIG. 19 shows an exemplary location of a radio resource to which an SB can be allocated.

In a frequency band, the SB can be allocated to a band which is advantageous for signal transmission. In addition, the SB can be allocated to a first or second slot of a symbol in a time domain.

Figure 20:
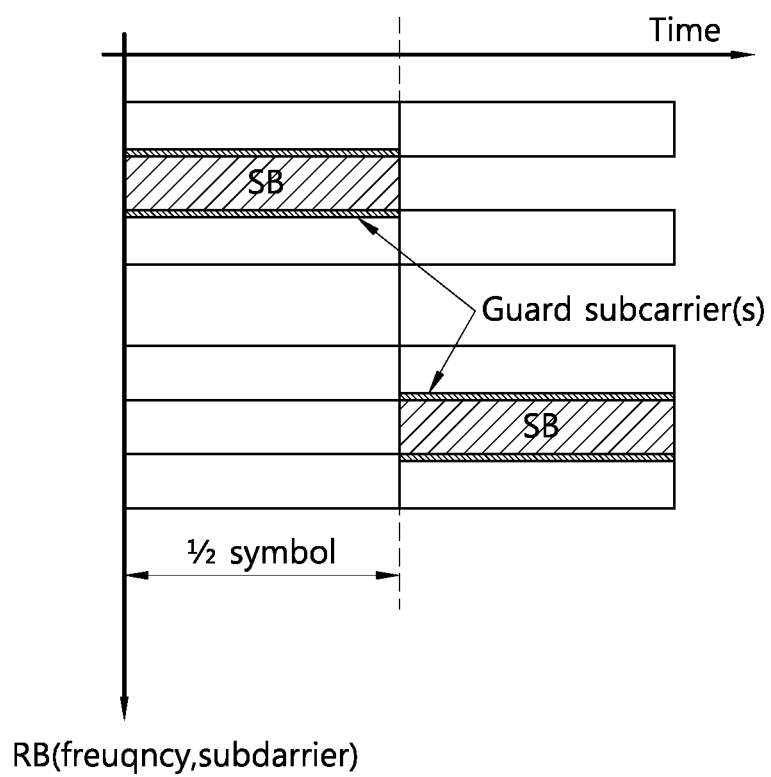
FIG. 20 and FIG. 21 show examples of configuring a guard subcarrier in a resource block adjacent to a short block.
Figure 21:
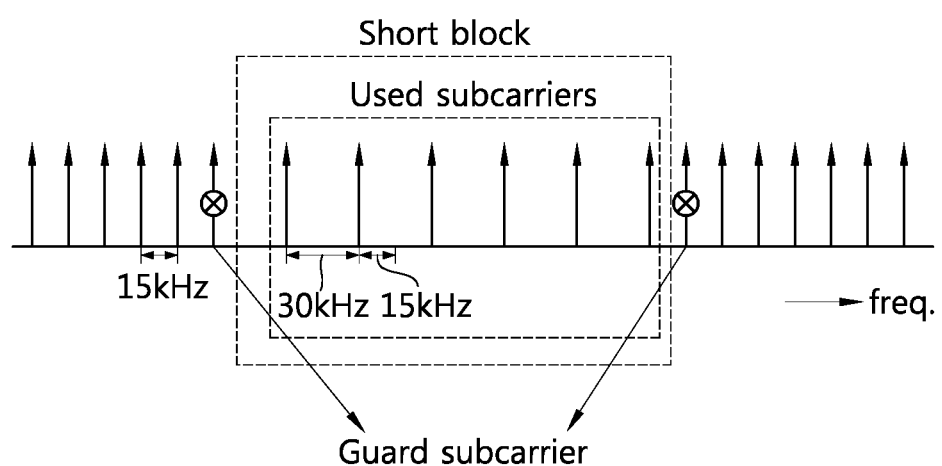

FIG. 20 and FIG. 21 show examples of configuring a guard subcarrier in a resource block adjacent to an SB.

As shown in FIG. 20, the guard subcarrier can be configured in a resource block adjacent to an SB in a frequency domain. A subcarrier spacing in the SB is 30 kHz, that is, a double of an LB. Therefore, the number of subcarriers that can be used in the SB is a half of the LB. For example, if the number of subcarriers of the LB is 12, the number of subcarriers of the SB is 6. No signal may be allocated to a subcarrier of an LB adjacent to an SB, thereby being able to take a role of a guard carrier. In this case, as shown in FIG. 21, six subcarriers included in the SB can be all used.

FIG. 22 to FIG. 26 show examples of configuring a guard subcarrier in an SB.

Figure 22:
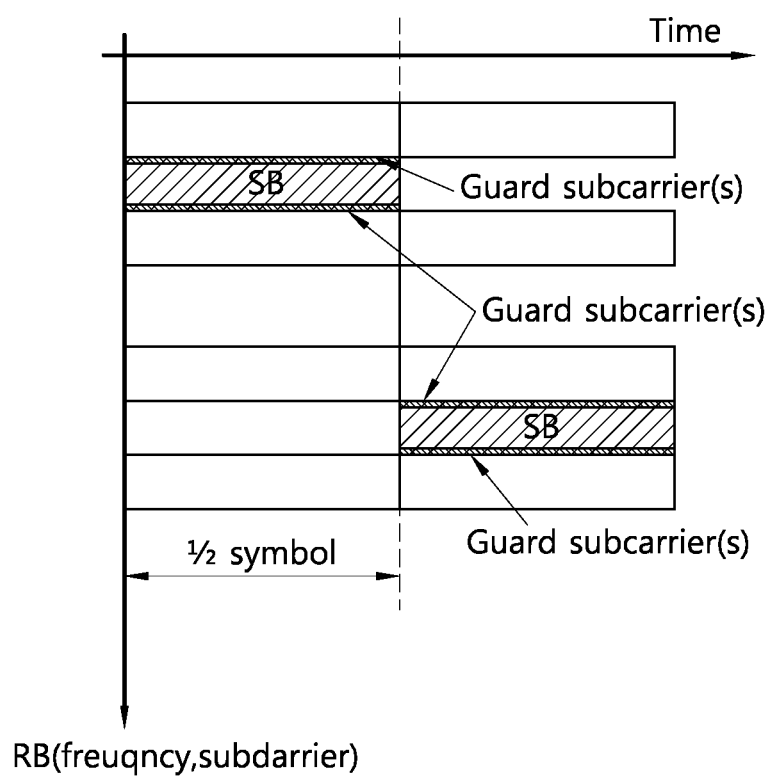
FIG. 22 to FIG. 26 show examples of configuring a guard subcarrier in a short block.
Figure 23:
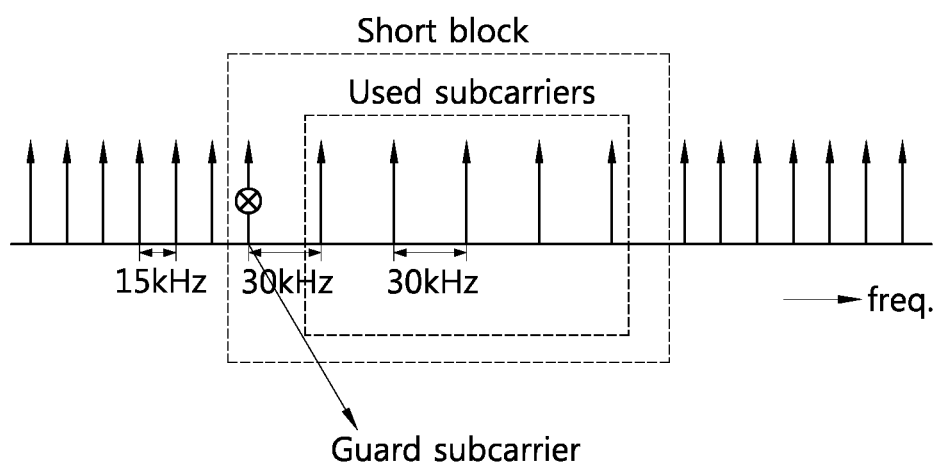
Figure 24:
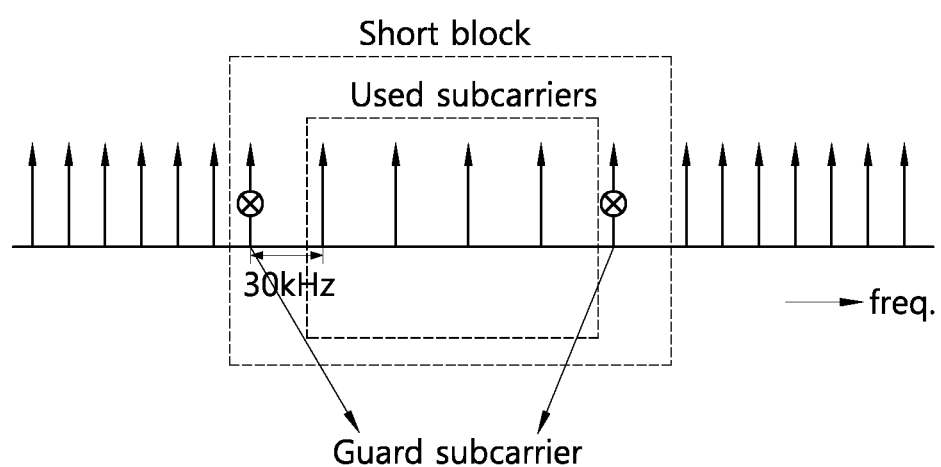
Figure 25:
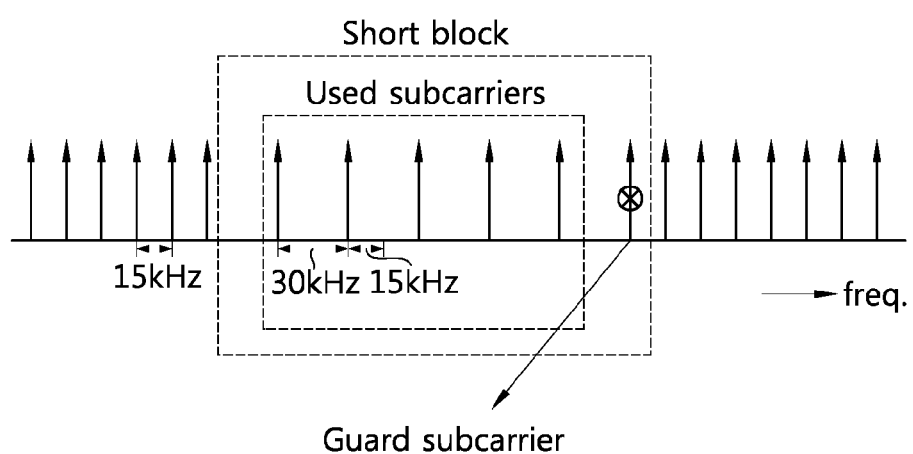
Figure 26:
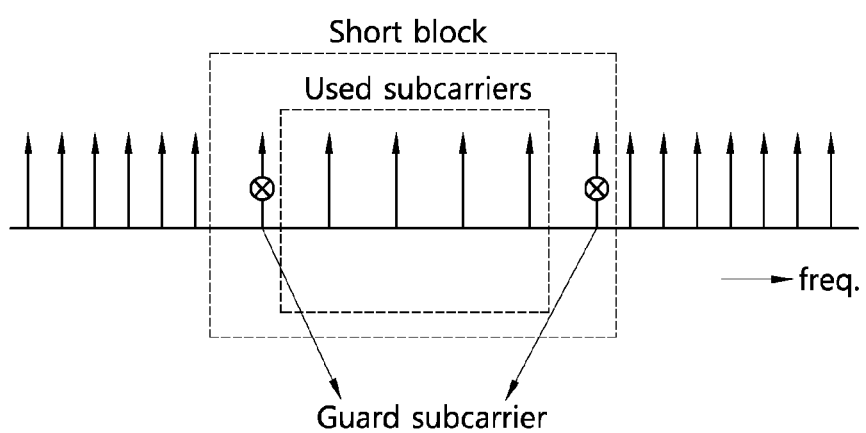

Although FIG. 22 to FIG. 24 show examples of configuring a guard subcarrier in both edges of a frequency domain of an SB, the present invention is not limited thereto. That is, the guard subcarrier may be configured in any one edge as shown in FIG. 25 or FIG. 26. When the guard carrier is configured in both edges, the number of subcarriers that can be used in the SB is decreased to 4, but there is an advantage in that interference acting on an adjacent resource block can be decreased. When a guard subcarrier is configured only in one edge, the number of subcarriers that can be used in the SB is 5. That is, the number of available subcarriers is increased in comparison with a case of configuring subcarriers in both edges. Therefore, by considering a channel condition of a backhaul link, e.g., a data amount or channel state of the backhaul link, how to configure the guard subcarrier can be determined. The interference acting on the adjacent resource block can be decreased due to the guard subcarrier configured in the SB. Unlike the example of FIG. 20 to FIG. 26, the guard subcarrier can be configured with a plurality of contiguous subcarriers.

Figure 27:
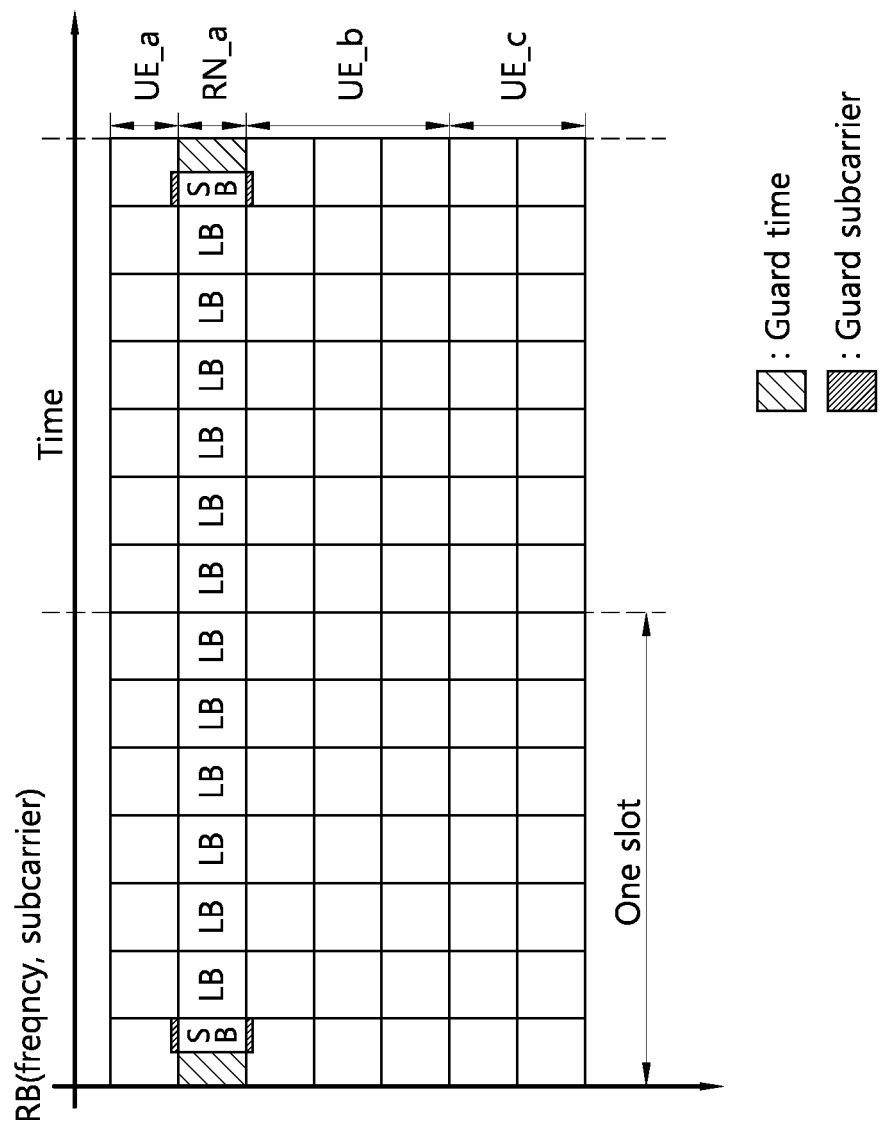
FIG. 27 and FIG. 28 show examples of allocating a guard subcarrier and a short block included in a subframe in a multi-user environment.
Figure 28:
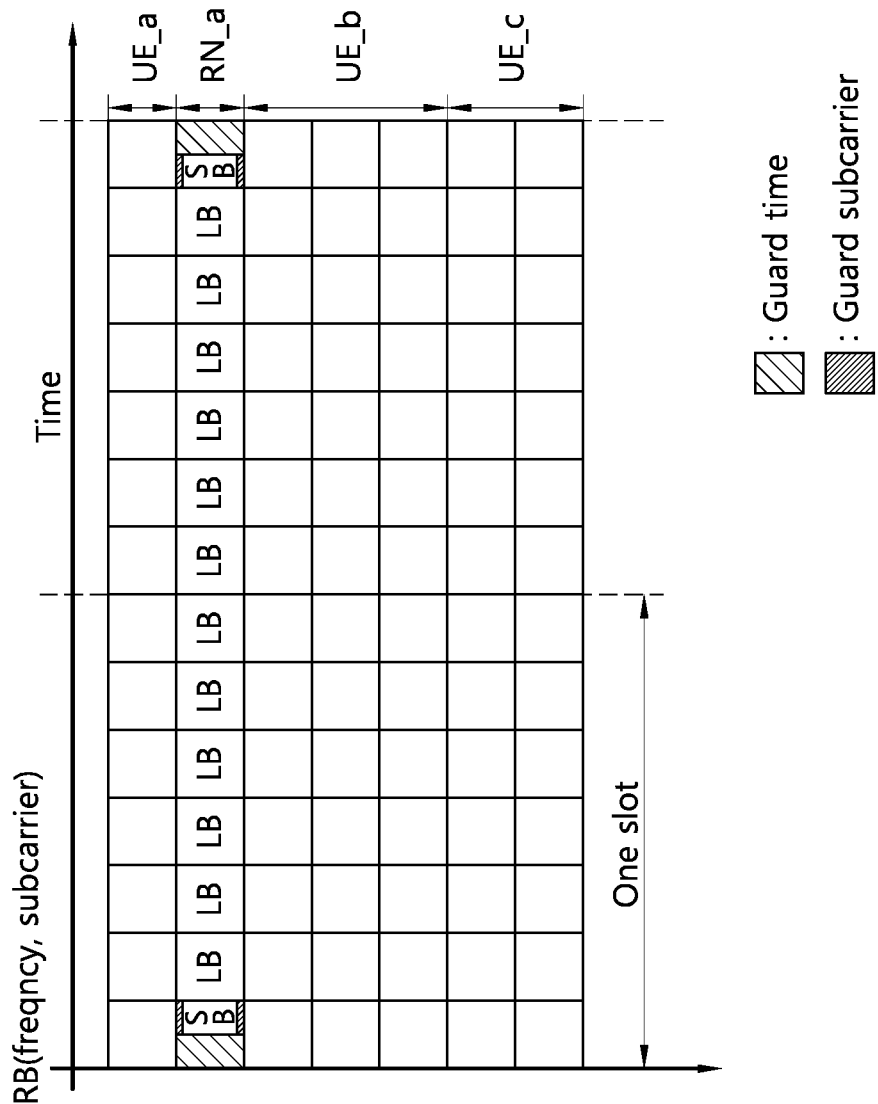

FIG. 27 and FIG. 28 show examples of allocating a guard subcarrier and an SB included in a subframe in a multi-user environment.

As shown in FIG. 27 and FIG. 28, a partial symbol of a symbol including a guard time in a frequency band allocated to an RS can be configured with an SB. The remaining symbols other than the symbol including the guard time can be configured with an LB. In FIG. 27, a guard subcarrier is configured in a resource block adjacent to an SB in the frequency domain. That is, the guard subcarrier is located in a frequency band allocated to a UE_a or a UE_b. On the other hand, in FIG. 28, a subcarrier located in an edge of an SB in the frequency domain is determined to the guard subcarrier.

Figure 29:
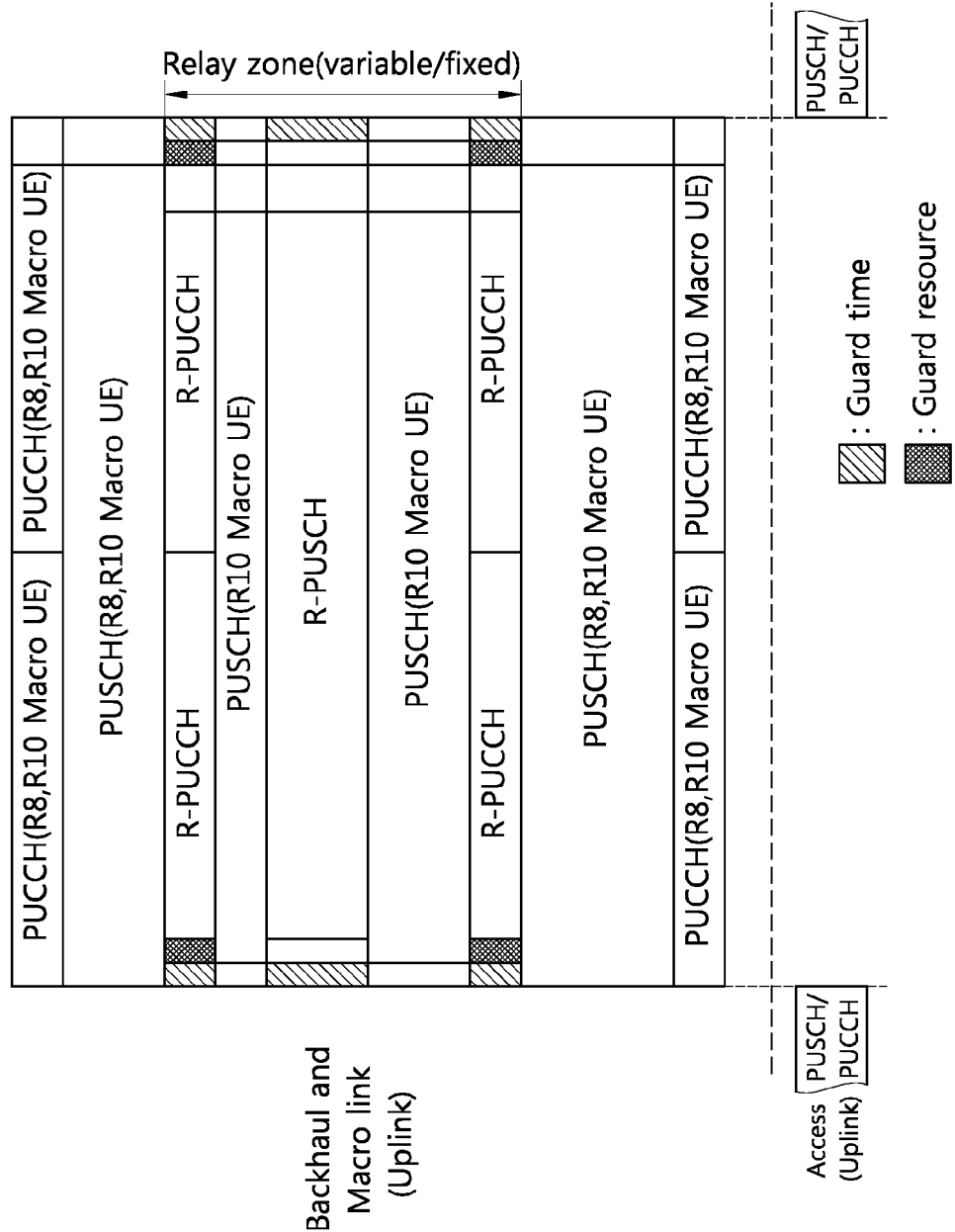
FIG. 29 and FIG. 30 show examples of a subframe structure that can be used in a backhaul uplink.
Figure 30:
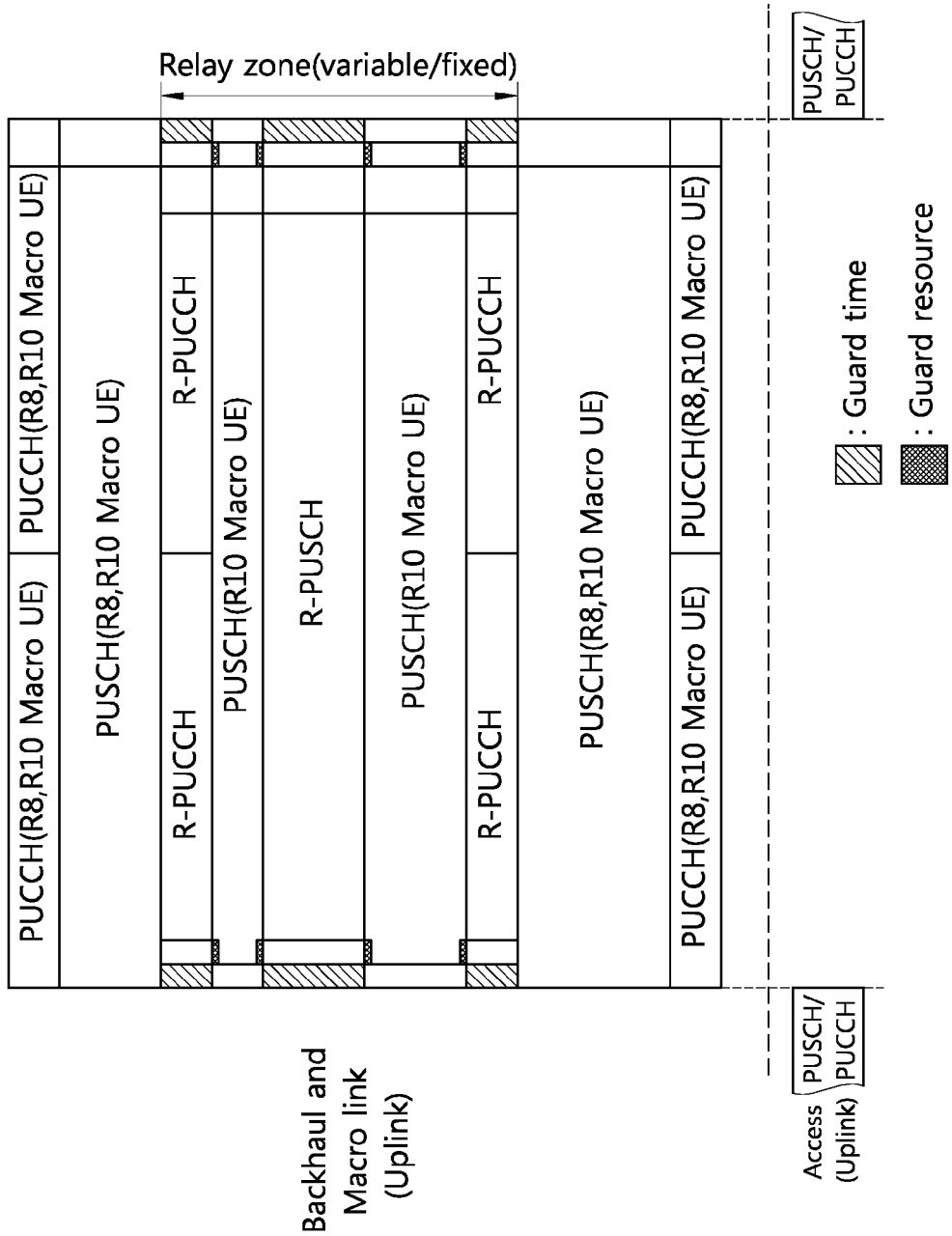

FIG. 29 and FIG. 30 show examples of a subframe structure that can be used in a backhaul uplink. In FIG. 29 and FIG. 30, a resource in which an uplink control signal is transmitted by an RS to a BS is indicated by an R-PUCCH, and a region in which data is transmitted is indicated by an R-PUSCH.

Referring to FIG. 29, if a guard time is included in a first symbol and a last symbol in an R-PUCCH region, a signal may not be transmitted in a partial symbol of the first symbol and the last symbol. Then, a partial symbol of a symbol including a guard time can take a role of a guard band for avoiding interference with respect to an R-PUSCH band or a frequency band allocated to a Ma UE. In this sense, the partial symbol of the first symbol and the last symbol can be referred to as a guard resource. If the frequency band allocated to an RS is great, a ratio of the guard resource is significantly small, and thus resource waste is not much problematic. The guard resource does not necessarily coincide with a partial symbol, and thus may be determined to be greater or smaller than the partial symbol.

Referring to FIG. 30, if a guard time is included in a first symbol and a last symbol in a band allocated to an RS, a partial symbol of the first symbol and the last symbol can be allocated to the Ma UE. In this case, a guard resource can be configured in a resource block adjacent to a partial symbol of the first symbol and the last symbol. For example, the Ma UE may not use at least one subcarrier adjacent to the partial symbol of the first symbol and the last symbol in a PUSCH region. In other words, some of radio resources allocated to the Ma UE (herein, some of the radio resources may be various, e.g., from one subcarrier to a plurality of resource blocks) are unused in order to avoid interference.

The aforementioned methods of FIG. 29 and FIG. 30 can be used in combination. That is, the RS does not transmit a signal in a partial symbol including a guard time. In addition, the Ma UE transmits a signal in a partial symbol which is unused by the RS, and may not transmit the signal in some radio resources of a PUSCH region adjacent to the partial symbol. Although a case of an uplink subframe is descried for example in the above description, the present invention can also equally apply to a downlink subframe.

Hereinafter, a signal demodulated in a receiver will be examined mathematically according to the method described with reference to FIG. 12 to FIG. 15, that is, the method of transmitting data repetitively in a partial symbol of a symbol including a guard time (i.e., a method of using a cyclic-copied symbol).

Assume that A(k) denotes a $k^{th}$ subcarrier signal of a first symbol, and B(k) denotes a $k^{th}$ subcarrier of a last symbol. Then, a time-domain signal of the first symbol and the last symbol can be determined by Equation 1 below.

$$a(n) = \sum_{k=0}^{N-1} A(k)e^{j2\pi kn/N}, \quad b(n) = \sum_{k=0}^{N-1} B(k)e^{j2\pi kn/N} \quad \text{[Equation 1]}$$

In Equation 1, N is an FFT size and denotes an exponent value of 2. If c(n) denotes a time-domain signal obtained by combining a signal of the first symbol and a signal of the last symbol, c(n) can be determined by Equation 2 below.

$$c(n) = \begin{cases} a(n), & 0 \leq n < N/2 \\ b(n), & N/2 \leq n < N \end{cases} \quad \text{[Equation 2]}$$

If C(M) denotes an $M^{th}$ subcarrier signal which is extracted after performing FFT on c(n) in a receiver, C(M) can be expressed by Equation 3 below. It is assumed herein that the $M^{th}$ subcarrier signal is cyclic-copied and thus A(M)=B(M).

$$C(M) = \frac{1}{N} \left[ \sum_{n=0}^{N/2-1} a(n)e^{-j2\pi Mn/N} + \sum_{n=N/2}^{N-1} b(n)e^{-j2\pi Mn/N} \right] \quad \text{[Equation 3]}$$

$$= \frac{1}{N} \sum_{n=0}^{N/2-1} \left[ \sum_{k=0}^{N-1} A(k)e^{j2\pi kn/N} e^{-j2\pi Mn/N} \right] +$$

$$\frac{1}{N} \sum_{n=N/2}^{N-1} \left[ \sum_{k=0}^{N-1} B(k)e^{j2\pi kn/N} e^{-j2\pi Mn/N} \right]$$

$$= \frac{1}{N} \sum_{k=0}^{N-1} \left[ \sum_{n=0}^{N/2-1} A(k)e^{j2\pi(k-M)n/N} + \sum_{n=N/2}^{N-1} B(k)e^{j2\pi(k-M)n/N} \right]$$

$$= \frac{1}{N} \sum_{k=0}^{N-1} \left[ \sum_{n=0}^{N/2-1} \{A(k) + e^{j\pi(k-M)} B(k)\} e^{j2\pi(k-M)n/N} \right]$$

$$= A(M) + \sum_{k=0, k \neq M}^{N-1} \left[ (A(k) + (-1)^{(k-M)} B(k)) \frac{1}{N} \sum_{n=0}^{N/2-1} e^{j2\pi(k-M)n/N} \right]$$

$$= A(M) + \sum_{k=0, k \neq M}^{N-1} [(A(k) + (-1)^{(k-M)} B(k)) f(k-m)]$$

That is, it can be expressed by a desired signal A(M) and other parts, i.e., inter-carrier interference (ICI). In Equation 3, the ICI is influenced by f(x).

Figure 31:
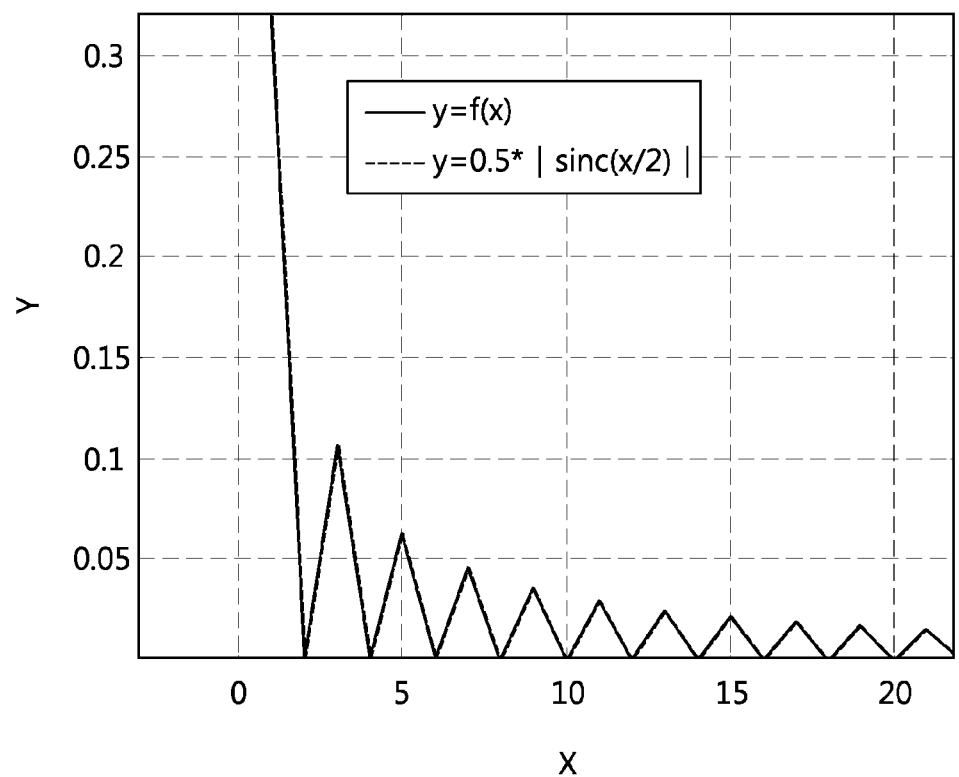
FIG. 31 is a graph showing f(x) of Equation 3 and a sync function.

FIG. 31 is a graph showing f(x) of Equation 3 and a sync function.

Referring to FIG. 31, in Equation 3, f(x) has a similar pattern as a sync function. f(x) is 0 when x is an even number. That is, if (k−M) is an even number in Equation 3, f(k−M) is 0. Therefore, it implies that the ICI does not exist from a subcarrier k which makes (k−M) an even number. Regarding a subcarrier k which makes (k−M) an odd number, a cyclic-copied symbol is carried on the subcarrier k, and thus the ICI does not exist if A(k)=B(k).

That is, a cyclic-copied subcarrier experiences ICI corresponding to a size of a sync function from a subcarrier which is not cyclic-copied. If a frequency band (i.e., a relay band) allocated to a backhaul link between a BS and an RS and a frequency band (i.e., a macro access band) allocated to a link between the BS and a UE are configured with subcarriers contiguous in a frequency band, a symbol transmitted in a cyclic-copied subcarrier can be restored by assigning a guard subcarrier between the relay band and the macro access band. If the guard subcarrier is not assigned, robust channel coding or signal repetition can be used to overcome ICI caused by the macro access band.

Hereinafter, a signal demodulated by a receiver will be examined mathematically when using a method of transmitting data by using an SB in a symbol including a guard time.

Assume that A(k) denotes a $k^{th}$ subcarrier signal of a symbol configured with an SB (hereinafter, such a symbol is referred to as an SB symbol), and B(k) denotes a $k^{th}$ subcarrier signal of a symbol configured with an LB (such a symbol is referred to as an LB symbol). A signal a(n) in a time domain of the SB symbol and a signal b(n) in a time domain of the LB symbol can be expressed by Equation 4 below.

$$a(n) = \sum_{k=0}^{N/2-1} A(k)e^{j4\pi kn/N}, \quad b(n) = \sum_{k=0}^{N-1} B(k)e^{j2\pi kn/N} \quad \text{[Equation 4]}$$

Herein, N is an FFT size and denotes an exponent value of 2.

A signal c(n) received in a receiver can be expressed by Equation 5 below.

$$c(n) = \begin{cases} b(n), & 0 \leq n < N/2 \\ a(n - N/2) + b(n), & N/2 \leq n < N \end{cases} \quad \text{[Equation 5]}$$

The receiver can extract an $M^{th}$ subcarrier by performing N-FFT on c(n) to decode an LB symbol. An $M^{th}$ subcarrier signal C(M) is expressed by Equation 6 below.

$$C(M) = \frac{1}{N} \left[ \sum_{n=0}^{N-1} c(n)e^{-j2\pi Mn/N} \right] \quad \text{[Equation 6]}$$

$$= \frac{1}{N} \left[ \sum_{n=0}^{N/2-1} b(n)e^{-j2\pi Mn/N} + \sum_{n=N/2}^{N-1} (a(n-N/2) + b(n))e^{-j2\pi Mn/N} \right]$$

$$\frac{1}{N} \sum_{n=0}^{N/2-1} \left[ \sum_{k=0}^{N-1} B(k)e^{j2\pi kn/N} e^{j2\pi Mn/N} \right] +$$

$$\frac{1}{N} \sum_{n=N/2}^{N-1} \left[ \sum_{k=0}^{N/2-1} A(k)e^{j4\pi k(n-N/2)/N} e^{-j2\pi Mn/N} + \sum_{k=0}^{N-1} B(k)e^{j2\pi kn/N} e^{-j2\pi Mn/N} \right]$$

$$= \frac{1}{N} \sum_{k=0}^{N-1} \left[ \sum_{n=0}^{N-1} B(k)e^{j2\pi(k-M)n/N} \right] +$$

$$\frac{1}{N} \sum_{k=0}^{N/2-1} \left[ \sum_{n=N/2}^{N-1} A(k)e^{j2\pi(2k-M)n/N - j2\pi k} \right]$$

$$= B(M) + \frac{1}{N} \sum_{k=0}^{N/2-1} \left[ A(k) \sum_{n=N/2}^{N-1} e^{j2\pi(2k-M)n/N} \right]$$

$$= B(M) + \frac{1}{N} \sum_{k=0}^{N/2-1} \left[ A(k) \sum_{n=0}^{N/2-1} e^{j2\pi(2k-M)n/N} e^{j\pi(2k-M)} \right]$$

$$= B(M) - \frac{1}{N} \sum_{k=0}^{N/2-1} \left[ A(k)(-1)^{(2k-M)} \sum_{n=0}^{N/2-1} e^{j2\pi(2k-M)n/N} \right]$$

$$= B(M) - \sum_{k=0}^{N/2-1} [A(k)(-1)^{(2k-M)} f(2k-M)]$$

An ICI element included in C(M) is $$\sum_{k=0}^{N/2-1} [A(k)(-1)^{(2k-M)} f(2k-M)].$$

If (2k−M) is 0 (i.e., k=M/2), then the ICI element is A(k). That is, in order to use the $M^{th}$ subcarrier of the LB symbol, an $(M/2)^{th}$ subcarrier of the SB must be unused. If k is not M/2, the ICI element is determined by f(x).

To decode a signal of an SB symbol, the receiver applies N/2-FFT to a rear part of c(n) and then extracts an $M^{th}$ subcarrier signal. If C'(M) denotes an $M^{th}$ subcarrier signal of the SB symbol, C'(M) is expressed by Equation 7 below.

$$\begin{aligned} C'(M) &= \frac{2}{N}\left[\sum_{n=N/2}^{N-1} c(n)e^{-j4\pi Mn/N}\right] \quad \text{[Equation 7]} \\ &= \frac{2}{N}\left[\sum_{n=N/2}^{N-1} (a(n-N/2)+b(n))e^{-j4\pi Mn/N}\right] \\ &= \frac{2}{N}\sum_{n=N/2}^{N-1}\left[\begin{array}{l}\sum_{k=0}^{N/2-1} A(k)e^{j4\pi k(n-N/2)/N}e^{-j4\pi Mn/N}+ \\ \sum_{k=0}^{N-1} B(k)e^{j2\pi kn/N}e^{-j4\pi Mn/N}\end{array}\right] \\ &= \frac{2}{N}\sum_{k=0}^{N/2-1}\left[\sum_{n=N/2}^{N-1} A(k)e^{j4\pi(k-M)n/N-j2\pi k}\right] + \\ &\quad \frac{2}{N}\sum_{k=0}^{N-1}\left[\sum_{n=N/2}^{N-1} B(k)e^{j2\pi(k-2M)n/N}\right] \\ &= \frac{2}{N}\sum_{k=0}^{N/2-1}\left[\sum_{n=0}^{N/2-1} A(k)e^{j4\pi(k-M)n/N}\right] + \\ &\quad \frac{2}{N}\sum_{k=0}^{N-1} B(k)\left[\sum_{n=N/2}^{N-1} e^{j2\pi(k-2M)n/N}\right] \\ &= A(M) + \sum_{k=0}^{N-1} [2B(k)(-1)^{(k-2M)} f(k-2M)] \end{aligned}$$

An ICI element included in C'(M) is $$\sum_{k=0}^{N-1} [2B(k)(-1)^{(k-2M)} f(k-2M)].$$

In this case, if (k−2M) is 0, that is, k=2M, then B(k) is directly output as the ICI element. That is, to use the $M^{th}$ subcarrier of the SB symbol, an $(2M)^{th}$ subcarrier of the LB symbol must be unused.

If k is not 2M, the ICI element is determined by f(x). In comparison with a case of using the aforementioned cyclic-copied symbol, an interference average effect is no longer present, and thus interference power is increased by 3 dB. On the other hand, since one more SB symbol is present in a last symbol of a subframe, the SB symbol can be utilized to prevent the interference power from being increased by 3 dB.

Figure 32:
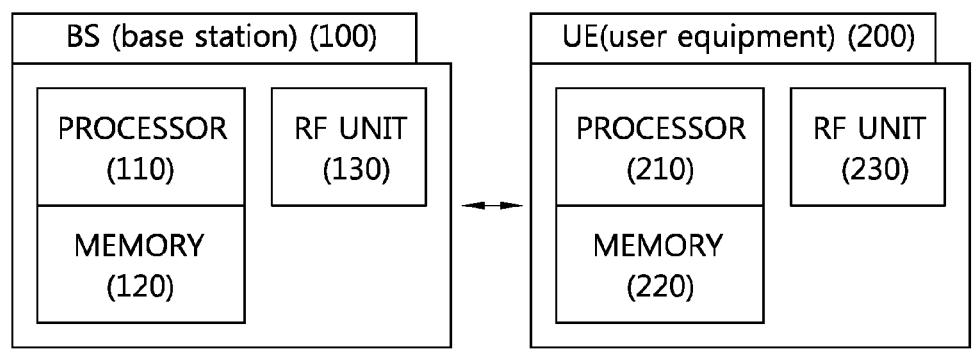
FIG. 32 is a block diagram showing a source station and a destination station.

FIG. 32 is a block diagram showing a source station and a destination station.

A source station 100 may be a BS or an RS. The source station 100 includes a processor 110, a memory 120, and a radio frequency (RF) unit 130. The processor 110 implements the proposed functions, procedures, and/or methods. That is, if a guard time is included in a subframe, a radio resource is allocated to a partial symbol of a symbol including the guard time, and then data is transmitted. The memory 120 coupled to the processor 110 stores a variety of information for driving the processor 110. The RF unit 130 coupled to the processor 110 transmits and/or receives a radio signal.

A destination station 200 may be an RS or an Re UE. The destination station 200 includes a processor 210, a memory 220, and an RF unit 230. The processor 210 can receive a radio signal in a partial symbol of two symbols each including a guard time, and can combine the radio signals to restore one piece of 1-symbol data. Layers of a radio interface protocol can be implemented by the processor 210. The memory 220 coupled to the processor 210 stores a variety of information for driving the processor 210. The RF unit 230 coupled to the processor 210 transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The OFDM transmitter and OFDM receiver of FIG. 7 can be implemented in the processors 110 and 210. The memories 120 and 220 may include a read-only memory (ROM), a random access memory (RAM), a flash memory, a memory card, a storage medium, and/or other equivalent storage devices. The RF units 130 and 230 may include one or more antenna ports for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for transmitting a signal in a wireless communication system, the method comprising:
   allocating a radio resource for transmitting a signal; and
   transmitting the signal to a destination station by using the radio resource,
   wherein the radio resource includes a plurality of symbols in a time domain, at least two symbols among the plurality of symbols include a guard time for switching transmission and reception of a signal,
   wherein the radio resource includes a partial symbol which is a radio resource other than the guard time in the symbol including the guard time,
   wherein the symbol including the guard time is a first symbol or a last symbol of a subframe and some pieces of data of whole symbol data are allocated to a partial symbol other than the guard time in the first symbol or the last symbol, and wherein if the radio resource is a subframe, a single symbol is configured by combining the partial symbol other than the guard time in the first symbol and the partial symbol other than the guard time in the last symbol, and a last symbol index of the subframe is assigned to the single symbol.

2. The method of claim 1, wherein the destination station is a relay station or a base station.

3. The method of claim 1, wherein the symbol is an orthogonal frequency division multiplexing (OFDM) symbol.

4. The method of claim 1, wherein the partial symbol other than the guard time in the first symbol includes a rear part of the whole symbol data, and a partial symbol other than the guard time in the second symbol includes a front part of the whole symbol data.

5. The method of claim 1, wherein a symbol index of a second symbol is assigned to 0 in the subframe, and symbol indices are assigned in an ascending order to symbols subsequent to the second symbol.

6. An apparatus comprising:
   a radio frequency (RF) unit transmitting and receiving a radio signal; and
   a processor coupled to the RF unit,
   wherein the processor is configured for allocating a radio resource for transmitting a signal and transmitting the signal to a destination station by using the radio resource,
   wherein the radio resource includes a plurality of symbols in a time domain, at least two symbols among the plurality of symbols include a guard time for transmission and reception switching of a signal, and the radio resource includes a partial symbol which is a radio resource other than the guard time in the symbol including the guard time,
   wherein the symbol including the guard time is a first symbol or a last symbol of a subframe and some pieces of data of whole symbol data are allocated to a partial symbol other than the guard time in the first symbol or the last symbol, and
   wherein if the radio resource is a subframe, a single symbol is configured by combining the partial symbol other than the guard time in the first symbol and the partial symbol other than the guard time in the last symbol, and a last symbol index of the subframe is assigned to the single symbol.

* * * * *